(12) United States Patent
Kato et al.

(10) Patent No.: US 10,683,933 B2
(45) Date of Patent: Jun. 16, 2020

(54) CONTROL APPARATUS FOR VEHICLE DRIVE-FORCE TRANSMITTING APPARATUS

(71) Applicant: TOYOTA JIDOSHA KABUSHIKI KAISHA, Toyota-shi, Aichi (JP)

(72) Inventors: Satoshi Kato, Toyota (JP); Susumu Moritomo, Toyota (JP); Masakazu Owatari, Nagakute (JP); Norihiro Tsukamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

(21) Appl. No.: 16/159,994

(22) Filed: Oct. 15, 2018

(65) Prior Publication Data

US 2019/0162303 A1     May 30, 2019

(30) Foreign Application Priority Data

Nov. 24, 2017   (JP) ................. 2017-226320

(51) Int. Cl.
| | |
|---|---|
| *F16H 61/70* | (2006.01) |
| *F16H 37/08* | (2006.01) |
| *F16H 61/66* | (2006.01) |
| *F16H 37/02* | (2006.01) |

(52) U.S. Cl.
CPC ....... *F16H 61/702* (2013.01); *F16H 37/0846* (2013.01); *F16H 61/66* (2013.01); *F16H 37/022* (2013.01); *F16H 2037/0866* (2013.01)

(58) Field of Classification Search
CPC ..... F16H 2037/0866; F16H 2037/0873; F16H 37/022; F16H 37/0833; F16H 37/084; F16H 37/0846; F16H 61/66; F16H 61/702

See application file for complete search history.

(56) References Cited

U.S. PATENT DOCUMENTS

| | | |
|---|---|---|
| 2016/0052522 A1 | 2/2016 | Matsuo et al. |
| 2016/0091090 A1 | 3/2016 | Kimura et al. |
| 2016/0121896 A1 | 5/2016 | Matsuo et al. |

FOREIGN PATENT DOCUMENTS

| | | |
|---|---|---|
| WO | 2014/147779 A1 | 9/2014 |
| WO | 2014/162563 A1 | 10/2014 |
| WO | 2014/170959 A1 | 10/2014 |
| WO | 2014/170960 A1 | 10/2014 |

*Primary Examiner* — Jacob S. Scott
(74) *Attorney, Agent, or Firm* — Oliff PLC

(57) ABSTRACT

A control apparatus for a vehicle drive-force transmitting apparatus which establishes selectively a first state in which a drive force is transmitted by a gear mechanism and a second state in which the drive force is transmitted by a continuously-variable transmission mechanism. The control apparatus executes a shift-up action requiring the first state to be switched to the second state, in (a) a case in which a state of the drive-force transmitting apparatus satisfies a first condition that a gear ratio of the continuously-variable transmission mechanism is not lower than a first gear ratio value and in (b) a case in which the state of the drive-force transmitting apparatus satisfies a second condition that a lap-down control is executed with the gear ratio of the continuously-variable transmission mechanism being not lower than a second gear ratio value that is lower than the first gear ratio value.

13 Claims, 5 Drawing Sheets

CONTROL APPARATUS FOR VEHICLE DRIVE-FORCE TRANSMITTING APPARATUS

This application claims priority from Japanese Patent Application No. 2017-226320 filed on Nov. 24, 2017, the disclosure of which is herein incorporated by reference in its entirety.

FIELD OF THE INVENTION

The present invention relates to a control apparatus for a drive-force transmitting apparatus that is to be provided in a vehicle, wherein the drive-force transmitting apparatus has a plurality of drive-force transmitting paths that are provided in parallel with each other between a drive force source and drive wheels of the vehicle.

BACKGROUND OF THE INVENTION

There is known a control apparatus for a drive-force transmitting apparatus that is to be provided in a vehicle having a drive force source and drive wheels, wherein the drive-force transmitting apparatus includes: an input rotary member to which a drive force is to be transmitted from the drive force source; an output rotary member from which the drive force is to be outputted to the drive wheels; a continuously-variable transmission mechanism; and a gear mechanism configured to provide at least one gear ratio, and wherein the drive-force transmitting apparatus defines a plurality of drive-force transmitting paths that are provided in parallel with each other between the input rotary member and the output rotary member. The plurality of drive-force transmitting paths include a first drive-force transmitting path through which the drive force is to be transmitted by the gear mechanism and a second drive-force transmitting path through which the drive force is to be transmitted by the continuously-variable transmission mechanism, such that a selected one of the first and second drive-force transmitting paths is established. WO2014/147779 discloses such a control apparatus for a drive-force transmitting apparatus that is to be provided in a vehicle. This publication of International Patent Application discloses that, in the drive-force transmitting apparatus in which a gear mechanism and a continuously-variable transmission mechanism are provided to be parallel with each other, the continuously-variable transmission mechanism provides a continuously-variable gear ratio which is variable within a given range and which is lower than a gear ratio provided by the gear mechanism. The publication also discloses that, when a shift-up action requiring the selected drive-force transmitting path to be switched from the first drive-force transmitting path (through which the drive force is to be transmitted by the gear mechanism) to the second drive-force transmitting path (through which the drive force is to be transmitted by the continuously-variable transmission mechanism) is to be executed, the execution of the shift-up action is started after the continuously-variable transmission mechanism has established a highest gear ratio value that corresponds to a maximum value within the given range of the continuously-variable gear ratio. It is noted that the term "gear ratio" is defined as "rotational speed of input-side rotary member/rotational speed of output-side rotary member". For example, the gear ratio of the above-described drive-force transmitting apparatus is defined as "rotational speed of the input rotary member/rotational speed of the output rotary member". A vehicle running speed could be lower as the gear ratio is higher, and could be higher as the gear ratio is lower. The above-described highest gear ratio value of the continuously-variable transmission mechanism can be expressed also as a lowest-speed gear ratio value.

SUMMARY OF THE INVENTION

By the way, a first state in which the first drive-force transmitting path is established and a second state in which the second drive-force transmitting path is established are switched to each other by a shift-up action or a shift-down action of the drive-force transmitting apparatus. There is a case in which the shift-up action, by which the first state is switched to the second state, is determined to be executed, in response to an operation made by an operator of the vehicle such as release of an accelerator by the operator. In this case, if the gear ratio of the continuously-variable transmission mechanism does not correspond to the highest gear ratio value upon determination for the execution of the shift-up action, the execution of the shift-up action is not started until the gear ratio of the continuously-variable transmission mechanism becomes the highest gear ratio value, thereby causing a time lag between the operator's operation and the execution of the shift-up action, and possibly giving a uncomfortable feeling to the operator. For example, when releasing the accelerator, the operator expects reduction of a rotational speed of the drive force source. However, since the rotational speed of the drive force source is not reduced until the execution of the shift-up action, an uncomfortable feeling could be given to the operator.

The present invention was made in view of the background art described above. It is therefore an object of the present invention to provide a control apparatus for a vehicle drive-force transmitting apparatus, which is capable of reducing an uncomfortable feeling given to a vehicle operator upon execution of the shift-up action of the drive-force transmitting apparatus by which the first state (in which the first drive-force transmitting path is established) is switched to the second state (in which the second drive-force transmitting path is established).

The object indicated above is achieved according to the following aspects of the present invention.

According to a first aspect of the invention, there is provided a control apparatus for a drive-force transmitting apparatus that is to be provided in a vehicle having a drive force source and drive wheels. The drive-force transmitting apparatus includes: an input rotary member to which a drive force is to be transmitted from the drive force source; an output rotary member from which the drive force is to be outputted to the drive wheels; a continuously-variable transmission mechanism configured to provide a continuously-variable gear ratio that is variable within a given range; and a gear mechanism configured to provide at least a gear ratio that is higher than the continuously-variable gear ratio provided by the continuously-variable transmission mechanism. The drive-force transmitting apparatus defines a plurality of drive-force transmitting paths that are provided in parallel with each other between the input rotary member and the output rotary member such that the drive force is to be transmitted from the input rotary member to the output rotary member through an established one of the drive-force transmitting paths. The plurality of drive-force transmitting paths include a first drive-force transmitting path, through which the drive force is to be transmitted by the gear mechanism when the first drive-force transmitting path is established, and also a second drive-force transmitting path, through which the drive force is to be transmitted by the continuously-variable transmission mechanism when the second drive-force transmitting path is established. The drive-force transmitting apparatus is configured to establish a selected state that is one of (i) a first state in which the first drive-force transmitting path is established and (ii) a second state in which the second drive-force transmitting path is established. The control apparatus comprises a transmission shifting control portion configured to execute a lap-down control by which a shift-down action requiring the selected state to be switched from the second state to the first state is executed together with execution of a shift-down action of the continuously-variable gear ratio that is executed to increase the continuously-variable gear ratio of the continuously-variable transmission mechanism to a predetermined high gear ratio value. When determining that a shift-up action requiring the selected state to be switched from the first state to the second state is to be executed, the transmission shifting control portion is configured to cause the drive-force transmitting apparatus to execute the shift-up action in (a) a case in which a state of the drive-force transmitting apparatus upon determination for execution of the shift-up action satisfies a first condition including a requirement that the continuously-variable gear ratio of the continuously-variable transmission mechanism is not lower than a first gear ratio value and in (b) a case in which the state of the drive-force transmitting apparatus satisfies a second condition including a requirement that the lap-down control is executed and a requirement that the continuously-variable gear ratio of the continuously-variable transmission mechanism is not lower than a second gear ratio value that is lower than the first gear ratio value. It is noted that the continuously-variable transmission mechanism, which is configured to provide the continuously-variable gear ratio, may be interpreted also to be configured to provide a plurality of gear ratios that are to be switched from one to another by a stepless shifting action. It is also noted that the control apparatus may further comprises a state determining portion that is configured, when the transmission shifting control portion determines that the shift-up action is to be executed, to determine whether the state of the drive-force transmitting apparatus upon the determination for execution of the shift-up action satisfies at least one of the first and second conditions, wherein the transmission shifting control portion is configured to cause the drive-force transmitting apparatus to execute the shift-up action, when the state determining portion determines that the state of the drive-force transmitting apparatus satisfies the at least one of the first and second conditions.

According to a second aspect of the invention, in the control apparatus according to the first aspect of the invention, the predetermined high gear ratio value is a highest value within the given range in which the continuously-variable gear ratio of the continuously-variable transmission mechanism is variable, or is a value adjacent to the highest value.

According to a third aspect of the invention, in the control apparatus according to the first or second aspect of the invention, the first gear ratio value is a predetermined first lower limit gear ratio value that is minimally required to determine that the continuously-variable gear ratio of the continuously-variable transmission mechanism corresponds to the predetermined high gear ratio value.

According to a fourth aspect of the invention, in the control apparatus according to any one of the first through third aspects of the invention, the second gear ratio value is a predetermined second lower limit gear ratio value that is minimally required to permit execution of the lap-down control.

According to a fifth aspect of the invention, in the control apparatus according to any one of the first through fourth aspects of the invention, it is determined that the lap-down control is executed, when the lap-down control is being actually executed, and when execution of the lap-down control has been terminated without a length of time, which has elapsed since termination of the execution of the lap-down control, exceeding a predetermined upper limit value that makes it possible to regard that the lap-down control is being actually executed.

According to a sixth aspect of the invention, in the control apparatus according to any one of the first through fifth aspects of the invention, the drive-force transmitting apparatus further includes a first engagement device that is provided in the first drive-force transmitting path and a second engagement device that is provided in the second drive-force transmitting path, wherein the first drive-force transmitting path is to be established by engagement of the first engagement device while the second drive-force transmitting path is to be established by engagement of the second engagement device, and wherein the transmission shifting control portion is configured to cause the drive-force transmitting apparatus to execute the shift-down action by engaging the first engagement device and releasing the second engagement device, and is configured to cause the drive-force transmitting apparatus to execute the shift-up action by releasing the first engagement device and engaging the second engagement device.

According to a seventh aspect of the invention, in the control apparatus according to the sixth aspect of the invention, the second engagement device is to be engaged by an engaging pressure applied to the second engagement device, wherein the transmission shifting control portion is configured, when the second condition is satisfied by the state of the drive-force transmitting apparatus, to cause the drive-force transmitting apparatus to execute the shift-up action, with the engaging pressure being made lower as the continuously-variable gear ratio of the continuously-variable transmission mechanism is lower.

According to an eighth aspect of the invention, in the control apparatus according to the seventh aspect of the invention, when the shift-up action is a power-off shift-up action that is determined to be executed as a result of reduction of a required drive force, the transmission shifting control portion is configured to cause the engaging pressure to be gradually increased after a rotational speed difference of the second engagement device becomes not larger than a first difference value that makes it possible to determine that the second engagement device is in a synchronized state, such that a rate of gradual increase of the engaging pressure is made lower as the continuously-variable gear ratio of the continuously-variable transmission mechanism upon initiation of the gradual increase of the engaging pressure is lower, whereby the engaging pressure is made lower as the continuously-variable gear ratio of the continuously-variable transmission mechanism is lower.

According to a ninth aspect of the invention, in the control apparatus according to the sixth aspect of the invention, the second engagement device is a frictional engagement device, wherein the second condition further includes a requirement that a rotational speed difference of the second engagement device is smaller than a second difference value that causes the second engagement device to be heated by an intolerable high degree.

According to a tenth aspect of the invention, in the control apparatus according to any one of the first through ninth aspects of the invention, when causing the drive-force transmitting apparatus to execute the shift-up action in the case in which the state of the drive-force transmitting apparatus satisfies the second condition, the transmission shifting control portion is configured to cause the continuously-variable transmission mechanism to continuously execute the shift-down action of the continuously-variable gear ratio by which the continuously-variable gear ratio of the continuously-variable transmission mechanism is increased to the predetermined high gear ratio value.

According to an eleventh aspect of the invention, in the control apparatus according to any one of the first through tenth aspects of the invention, the shift-down action, which is executed in execution of the lap-down control, is a power-on shift-down action that is determined to be executed as a result of increase of a required drive force.

According to a twelfth aspect of the invention, in the control apparatus according to any one of the first through eleventh aspects of the invention, the continuously-variable transmission mechanism is a belt-type continuously-variable transmission including a primary pulley, a secondary pulley, a transfer element that is looped over the primary and secondary pulleys.

When the lap-down control is being executed, the continuously-variable gear ratio of the continuously-variable transmission mechanism is less likely to be not lower than the first gear ratio value. In the control apparatus according to the first aspect of the invention, the drive-force transmitting apparatus is caused to execute the shift-up action not only when the above-described first condition is satisfied but also the above-described second condition is satisfied, wherein the second condition includes the requirement that the lap-down control is executed and the requirement that the continuously-variable gear ratio of the continuously-variable transmission mechanism is not lower than the second gear ratio value (that is lower than the first gear ratio value). Thus, when the lap-down control is being executed, there is a case in which the shift-up action is executed even if the continuously-variable gear ratio is lower than the first gear ratio value, for thereby making it possible to reduce an uncomfortable feeling given to an operator of the vehicle when the shift-up action is executed in the drive-force transmitting apparatus.

In the control apparatus according to the second aspect of the invention, the predetermined high gear ratio value is the highest value within the given range in which the continuously-variable gear ratio of the continuously-variable transmission mechanism is variable, or is the value adjacent to the highest value. Thus, the execution of the lap-down control facilitates a preparation for next execution of the shift-up action in the drive-force transmitting apparatus.

When the lap-down control is being executed, the continuously-variable gear ratio of the continuously-variable transmission mechanism is less likely to have become the predetermined high gear ratio value. In the control apparatus according to the third aspect of the invention, the first gear ratio value is a predetermined first lower limit gear ratio value that is minimally required to determine that the continuously-variable gear ratio of the continuously-variable transmission mechanism corresponds to the predetermined high gear ratio value. Thus, there is a case in which the shift-up action is executed even without the gear ratio of the continuously-variable transmission mechanism having become the predetermined high gear ratio value.

In the control apparatus according to the fourth aspect of the invention, the second gear ratio value is a predetermined second lower limit gear ratio value that is minimally required to permit execution of the lap-down control. Thus, when the shift-up action is determined to be executed during execution of the lap-down control, the shift-up action can be more likely to be permitted to be executed.

When the lap-down control is being executed, the continuously-variable gear ratio of the continuously-variable transmission mechanism is less likely to be not lower than the first gear ratio value. In the control apparatus according to the fifth aspect of the invention, it is determined that the lap-down control is executed when the drive-force transmitting apparatus is in a state in which the lap-down control is being actually executed and also when the drive-force transmitting apparatus is in a state in which execution of the lap-down control has been terminated without a length of time, which has elapsed since termination of the execution of the lap-down control, exceeding a predetermined upper limit value that makes it possible to regard that the lap-down control is being actually executed. Thus, when the lap-down control is being executed, there is a case in which the shift-up action is executed even if the continuously-variable gear ratio is lower than the first gear ratio value.

In the control apparatus according to the sixth aspect of the invention, an uncomfortable feeling given to an operator of the vehicle can be reduced where the shift-up action is executed in the drive-force transmitting apparatus by release of the first engagement device and engagement of the second engagement device.

In the control apparatus according to the seventh aspect of the invention, the shift-up action, which is determined to be executed during execution of the lap-down control, is executed with the engaging pressure (that is applied to the second engagement device) being made lower as the continuously-variable gear ratio of the continuously-variable transmission mechanism is lower. It is therefore possible to reduce a shock caused upon engagement of the second engagement device.

In the control apparatus according to the eighth aspect of the invention, the shift-up action, which is determined to be executed during execution of the lap-down control, is executed such that the rate of gradual increase of the engaging pressure (that is applied to the second engagement device) is made lower as the continuously-variable gear ratio of the continuously-variable transmission mechanism upon initiation of the gradual increase of the engaging pressure is lower, whereby the engaging pressure is made lower as the continuously-variable gear ratio of the continuously-variable transmission mechanism is lower. It is therefore possible to appropriately reduce the shock caused upon engagement of the second engagement device.

In the control apparatus according to the ninth aspect of the invention, the shift-up action, which is determined to be executed during execution of the lap-down control, is executed when the rotational speed difference of the second engagement device is smaller than the predetermined second difference value that causes the second engagement device to be heated by an intolerable high degree. Thus, it is possible to restrain reduction of durability of the second engagement device due to heat generation in the second engagement device.

In the control apparatus according to the tenth aspect of the invention, when the shift-up action, which is determined to be executed during execution of the lap-down control, is executed, the shift-down action is continuously executed to increase the continuously-variable gear ratio of the continuously-variable transmission mechanism toward the predetermined high gear ratio value. It is therefore possible to easily place the second engagement device into the synchronized state or to easily reduce the rotational speed difference in the second engagement device.

In the control apparatus according to the eleventh aspect of the invention, the shift-down action, which is executed in execution of the lap-down control, is the power-on shift-down action. Thus, since the power-on shift-down action could be executed even without the gear ratio of the continuously-variable transmission mechanism corresponding to the predetermined high gear ratio value, a higher priority can be given to a shock reduction rather than to an acceleration responsiveness.

In the control apparatus according to the twelfth aspect of the invention, it is possible to reduce an uncomfortable feeling given to the vehicle operator where the shift-up action is executed in the drive-force transmitting apparatus which defines the first and second drive-force transmitting paths that are provided in parallel with each other, wherein the drive force is to be transmitted through the first drive-force transmitting path by the gear mechanism that provides at least a gear ratio, and the drive force is to be transmitted through the second drive-force transmitting path by the belt-type continuously-variable transmission as the continuously-variable transmission mechanism.

DETAILED DESCRIPTION OF PREFERRED EMBODIMENT

In the embodiment of the present invention, each of the primary pulley (i.e., input-side pulley) and the secondary pulley (i.e., output-side pulley) includes, for example, a fixed sheave, a movable sheave and a hydraulic actuator, which is configured to apply a thrust for changing a width of an annular groove defined between the fixed and movable sheaves of a corresponding one of the primary and secondary pulleys. A vehicle provided with the above-described drive-force transmitting apparatus includes a hydraulic control unit configured to control pulley hydraulic pressures supplied as working hydraulic pressures to the respective hydraulic actuators, independently of each other. The hydraulic control unit may be configured to control an amount of flow of a working fluid supplied to each of the hydraulic actuators so as to consequently generate the pulley hydraulic pressures, for example. A shifting control operation is performed by the hydraulic control unit to execute a shifting action to establish a target gear ratio while preventing a belt slippage in the continuously-variable transmission mechanism, by controlling the thrust (=pulley hydraulic pressure*pressure receiving area) applied to each of the primary and secondary pulleys. The transfer element, which is looped over the primary and secondary pulleys, may be a compression-type endless annular transmission belt including at least one endless annular hoop and a multiplicity of thick-plate-shaped block elements that are held by the at least one endless annular hoop so as to be arranged in their thickness direction corresponding to a circumferential direction of the transmission belt, along the at least one endless annular hoop, or alternatively, a tension-type belt constituting an endless annular link chain including a plurality of link plates alternately superposed and mutually connected at their end portions through connecting pins. The above-described continuously variable transmission mechanism is a known belt-type continuously-variable transmission, and can be broadly interpreted to conceptually encompass not only the belt-type continuously-variable transmission but also a chain-type continuously-variable transmission.

The above-described drive force source is, for example, an internal combustion engine such as a gasoline engine and a diesel engine generating a drive force by combustion of fuel supplied thereto. The vehicle may be equipped with, in addition to or in place of a drive force source in the form of the engine, another drive force source in the form of, for example, an electric motor.

Hereinafter, preferred embodiments of the invention will be described in detail with reference to the accompanying drawings.

First Embodiment

Figure 1:
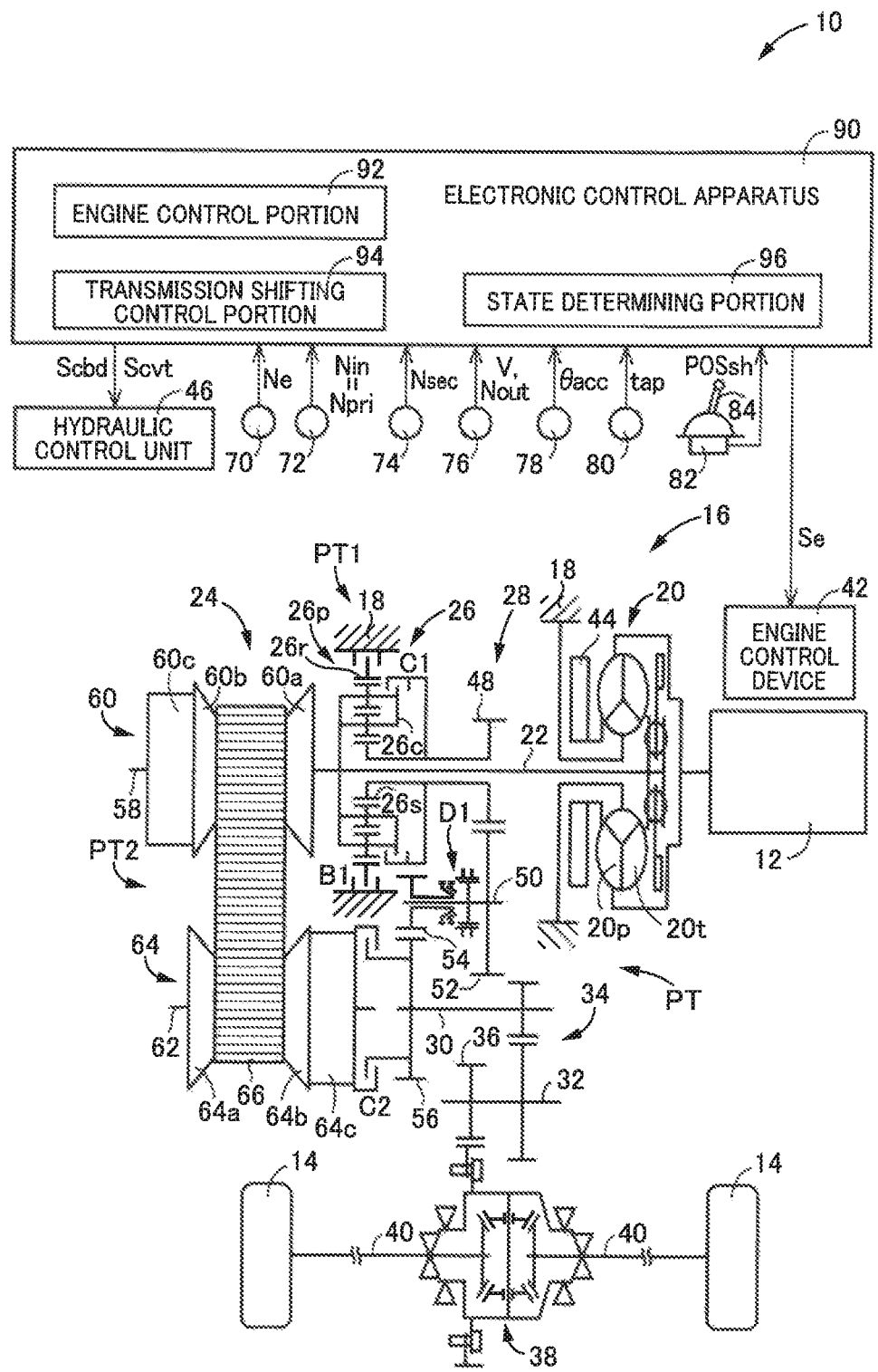
FIG. 1 is a schematic view showing a construction of a vehicle to be controlled by a control apparatus according to the present invention, and major control functions and control portions of the control apparatus.

FIG. 1 is a schematic view showing a construction of a vehicle 10 to be controlled by a control apparatus according to the present invention, and major control functions and control portions of the control apparatus. As shown in FIG. 1, the vehicle 10 is provided with an engine 12 functioning as a drive force source configured to generate a drive force, drive wheels 14 and a drive-force transmitting apparatus 16 that is provided in drive-force transmitting paths between the engine 12 and the drive wheels 14.

The drive-force transmitting apparatus 16 includes a non-rotary member in the form of a casing 18, a fluid-operated type drive-force transmitting device in the form of a known torque converter 20 that is connected to the engine 12, an input shaft 22 connected to the torque converter 20, a continuously-variable transmission mechanism 24 connected to the input shaft 22, a forward/reverse switching device 26 connected to the input shaft 22, a gear mechanism 28 which is provided in parallel with the continuously-variable transmission mechanism 24 and which is connected to the input shaft 22 via the forward/reverse switching device 26, an output shaft 30 serving as an output rotary member that is common to the continuously-variable transmission mechanism 24 and the gear mechanism 28, a counter shaft 32, a reduction gear device 34 consisting of a pair of mutually meshing gears each of which is connected to a corresponding one of the output shaft 30 and the counter shaft 32 so as to unrotatable relative to the corresponding one of the shafts 30, 32, a gear 36 connected to the counter shaft 32 so as to be unrotatable relative to the counter shaft 32, and a differential gear device 38 connected to the gear 36. The torque converter 20, input shaft 22, continuously-variable transmission mechanism 24, forward/reverse switching device 26, gear mechanism 28, output shaft 30, counter shaft 32, reduction gear device 34, gear 36 and differential gear device 38 are disposed within the casing 18. The drive-force transmitting apparatus 16 further includes right and left axles 40 that are connected to the differential gear device 38. The input shaft 22 serves as an input rotary member to which the drive force of the engine 12 is to be inputted. The output shaft 30 serves as the output rotary member through which the drive force of the engine 12 is to be outputted. It is noted that the above-described drive force is synonymous with a drive torque or a drive power unless otherwise distinguished from them.

In the drive-force transmitting apparatus 16 constructed as described above, the drive force generated by the engine 12 is transmitted to the right and left drive wheels 14, via the torque converter 20, forward/reverse switching device 26, gear mechanism 28, reduction gear device 34, differential gear device 38, axles 40 and other elements, or alternatively, via the torque converter 20, continuously-variable transmission mechanism 24, reduction gear device 34, differential gear device 38, axles 40 and other elements.

As described above, the drive-force transmitting apparatus 16 has the gear mechanism 28 and the continuously-variable transmission mechanism 24 that are provided in parallel with each other in respective drive-force transmitting paths PT between the engine 12 and the drive wheels 14. Specifically, the drive-force transmitting apparatus 16 has the gear mechanism 28 and the continuously-variable transmission mechanism 24 that are provided in parallel with each other in the respective drive-force transmitting paths PT between the input shaft 22 and the output shaft 30. That is, the drive-force transmitting apparatus 16 defines the plurality of drive-force transmitting paths that are parallel with each other between the input shaft 22 and the output shaft 30, such that the drive force of the engine 12 is to be transmitted from the input shaft 22 to the output shaft 30 through a selected one of the drive-force transmitting paths PT. The plurality of drive-force transmitting paths PT consist of a first drive-force transmitting path PT1 constituted mainly by the gear mechanism 28 and a second drive-force transmitting path PT2 constituted mainly by the continuously-variable transmission mechanism 24. The first and second drive-force transmitting paths PT1, PT2 are defined in parallel with each other between the input shaft 22 and the output shaft 30. The first drive-force transmitting path PT1 is a path through which the drive force of the engine 12 is to be transmitted from the input shaft 22 toward the drive wheels 14 through the gear mechanism 28. The second drive-force transmitting path PT2 is a path through which the drive force of the engine 12 is to be transmitted from the input shaft 22 toward the drive wheels 14 through the continuously-variable transmission mechanism 24.

In the drive-force transmitting apparatus 16, the drive force of the engine 12 is transmitted toward the drive wheels 14 through a selected one of the first and second drive-force transmitting paths PT1, PT2, which is selected depending on a running state of the vehicle 10. To this end, the drive-force transmitting apparatus 16 includes a plurality of engagement devices by which the selected one of the first and second drive-force transmitting paths PT1, PT2 is established. The plurality of engagement devices include a first clutch C1, a first brake B1 and a second clutch C2. The first clutch C1, which serves as a first engagement device, is disposed in the first drive-force transmitting path PT1 and is configured to selectively connect and disconnect the first drive-force transmitting path PT1, such that the first drive-force transmitting path PT1 is established with engagement of the first clutch C1 during forward running of the vehicle 10. The first brake B1, which serves as an engagement device, is also disposed in the first drive-force transmitting path PT1 and is configured to selectively connect and disconnect the first drive-force transmitting path PT1, such that the first drive-force transmitting path PT1 is established with engagement of the first brake B1 during reverse running of the vehicle 10. That is, the first drive-force transmitting path PT1 is established with either the first clutch C1 or the first brake B1 being engaged. The second clutch C2, which serves as a second engagement device, is disposed in the second drive-force transmitting path PT2 and is configured to selectively connect and disconnect the second drive-force transmitting path PT2, such that the second drive-force transmitting path PT2 is established with engagement of the second clutch C2. That is, the second drive-force transmitting path PT2 is established with the second clutch C2 being engaged. Each of the first clutch C1, first brake B1 and second clutch C2 is a known hydraulically-operated wet-type frictional engagement device that is to be frictionally engaged by operation of a hydraulic actuator. As described below, each of the first clutch C1 and the first brake B1 constitutes a part of the forward/reverse switching device 26.

The engine 12 is provided with an engine control device 42 including an electronic throttle device, a fuel injection device, an ignition device and other devices that are required for controlling an output of the engine 12. In the engine 12, the engine control device 42 is controlled, by an electronic control apparatus 90 (that corresponds to a control apparatus recited in the appended claims), based on an operation amount θacc of an accelerator pedal that corresponds to a required drive force of the vehicle 10 required by an operator of the vehicle 10, whereby an engine torque Te of the engine 12 is controlled.

The torque converter 20 is provided with a pump impeller 20p and a turbine impeller 20t that are connected to the engine 12 and the input shaft 22, respectively. The drive-force transmitting apparatus 16 is provided with a mechanical oil pump 44 connected to the pump impeller 20p. The oil pump 44 is to be driven by the engine 12, to supply a working fluid pressure as its original pressure to a hydraulic control unit (hydraulic control circuit) 46 provided in the vehicle 10, for performing a shifting control operation in the continuously-variable transmission mechanism 24, generating a belt clamping force in the continuously-variable transmission mechanism 24, and switching an operation state of each of the above-described engagement devices between its engaged state and released state.

The forward/reverse switching device 26 includes a planetary gear device 26p of double-pinion type in addition to the first clutch C1 and the first brake B1. The planetary gear device 26p is a differential mechanism including three rotary elements consisting of an input element in the form of a carrier 26c, an output element in the form of a sun gear 26s and a reaction element in the form of a ring gear 26r. The carrier 26c is connected to the input shaft 22. The ring gear 26r is operatively connected to the casing 18 through the first brake B1. The sun gear 26s is connected to a small-diameter gear 48 that is provided to be coaxial with the input shaft 22 and rotatable relative to the input shaft 22. The carrier 26c and the sun gear 26s are operatively connected to each other through the first clutch C1.

The gear mechanism 28 includes, in addition to the above-described small-diameter gear 48, a gear-mechanism counter shaft 50 and a large-diameter gear 52 which meshes with the small-diameter gear 48 and which is provided to be coaxial with the gear-mechanism counter shaft 50 and unrotatable relative to the gear-mechanism counter shaft 50. The large-diameter gear 52 has a diameter larger than that of the small-diameter gear 48. The gear mechanism 28 further includes an idler gear 54 that is provided to be coaxial with the gear-mechanism counter shaft 50 and rotatable relative to the gear-mechanism counter shaft 50, and an output gear 56 that is provided to be coaxial with the output shaft 30 and unrotatable relative to the output shaft 30. The output gear 56 has a diameter larger than that of the idler gear 54. Therefore, the gear mechanism 28 provides a gear ratio between the input shaft 22 and the output shaft 30 in the first drive-force transmitting path PT1. That is, the gear mechanism 28 corresponds to a gear mechanism configured to provide at least one gear ratio. The gear mechanism 28 further includes a dog clutch D1 as an engagement device that is disposed on the gear-mechanism counter shaft 50 between the large-diameter gear 52 and the idler gear 54 so as to selectively connect and disconnect a drive-force transmitting path between the two gears 52, 54. The dog clutch D1 is configured to selectively connect and disconnect the first drive-force transmitting path PT1, such that the first drive-force transmitting path PT1 is established with engagement of the dog clutch D1. The dog clutch D1, which is also included in the above-described plurality of engagement devices, serves as a third engagement device that cooperates with the above-described first engagement device to establish the first drive-force transmitting path PT1. That is, the first drive-force transmitting path PT1 is established with both of the dog clutch D1 and the first engagement device being engaged. An operation state of the dog clutch D1 is switched by operation of a hydraulic actuator (not shown) that is included in the drive-force transmitting apparatus 16.

The first drive-force transmitting path PT1 is established with both of the dog clutch D1 and the first engagement device being engaged, namely, with both of engagement of the dog clutch D1 and engagement of either one of the first clutch C1 and the first brake B1 which cooperate with each other to constitute the first engagement device and which are located to be closer to the input shaft 22 than the dog clutch D1. When the first clutch C1 as well as the dog clutch D1 is engaged, the first drive-force transmitting path PT1 for forward running of the vehicle 10 is established. When the first brake B1 as well as the dog clutch D1 is engaged, the first drive-force transmitting path PT1 for reverse running of the vehicle 10 is established. In the drive-force transmitting apparatus 16, with the first drive-force transmitting path PT1 being established, the drive-force transmitting apparatus 16 is placed in its drive-force transmittable state in which the drive force of the engine 12 is transmittable from the input shaft 22 to the output shaft 30 through the gear mechanism 28. With the first drive-force transmitting path PT1 being cut off by release of both of the first clutch C1 and the first brake B1 or by release of the dog clutch D1, the drive-force transmitting apparatus 16 is placed in its neutral state in which the drive force is not transmittable.

The continuously-variable transmission mechanism 24 includes a primary shaft 58 provided to be coaxial with the input shaft 22 and connected integrally to the input shaft 22, a primary pulley 60 connected to the primary shaft 58 and having a variable effective diameter, a secondary shaft 62 provided to be coaxial with the output shaft 30, a secondary pulley 64 connected to the secondary shaft 62 and having a variable effective diameter, and a transfer element in the form of a transmission belt 66 looped over or mounted on the pulleys 60, 64. The continuously-variable transmission mechanism 24 is a known belt-type continuously-variable transmission in which the drive force is transmitted owing to a friction force generated between the transmission belt 66 and each of the pulleys 60, 64, and is configured to transmit the drive force of the engine 12 toward the drive wheels 14. The friction force is synonymous with a clamping force, and is referred also to as a belt clamping force. The belt clamping force corresponds to a belt torque capacity Tcvt that is a torque capacity of the transmission belt 66 in the continuously-variable transmission mechanism 24.

The primary pulley 60 includes a fixed sheave 60a connected to the primary shaft 58, a movable sheave 60b unrotatable about an axis of the primary shaft 58 and axially movable relative to the fixed sheave 60a, and a hydraulic actuator 60c configured to apply a primary thrust Wpri to the movable sheave 60b. The primary thrust Wpri is a thrust (=primary pressure Ppri*pressure receiving area) for changing a width of a V-shaped groove defined between the fixed and movable sheaves 60a, 60b of the primary pulley 60. That is, the primary thrust Wpri is a thrust applied to the primary pulley 60 from the hydraulic actuator 60c, to clamp the transmission belt 66 that is mounted on the primary pulley 60. The primary pressure Ppri is a hydraulic pressure supplied from the hydraulic control unit 46 to the hydraulic actuator 60c, and serves as a pulley hydraulic pressure for generating the primary thrust Wpri. Meanwhile, the secondary pulley 64 includes a fixed sheave 64a connected to the secondary shaft 62, a movable sheave 64b unrotatable about an axis of the secondary shaft 62 and axially movable relative to the fixed sheave 64a, and a hydraulic actuator 64c configured to apply a secondary thrust Wsec to the movable sheave 64b. The secondary thrust Wsec is a thrust (=secondary pressure Psec*pressure receiving area) for changing a width of a V-shaped groove defined between the fixed and movable sheaves 64a, 64b of the secondary pulley 64. That is, the secondary thrust Wsec is a thrust applied to the secondary pulley 64 from the hydraulic actuator 64c, to clamp the transmission belt 66 that is mounted on the secondary pulley 64. The secondary pressure Psec is a hydraulic pressure supplied from the hydraulic control unit 46 to the hydraulic actuator 64c, and serves as a pulley hydraulic pressure for generating the secondary thrust Wsec.

In the continuously-variable transmission mechanism 24, the primary and secondary pressures Ppri, Psec are controlled by the hydraulic control unit 46 that is controlled by the electronic control apparatus 90, whereby the primary and secondary thrusts Wpri, Wsec are respectively controlled. With the primary and secondary thrusts Wpri, Wsec being controlled, the widths of the V-shaped grooves of the respective pulleys 60, 64 are controlled to be changeable whereby a belt winding diameter (effective diameter) of each of the pulleys 60, 64 is changeable and accordingly a gear ratio γcvt (=primary rotational speed Npri/secondary rotational speed Nsec) of the continuously-variable transmission mechanism 24 is changeable. Further, with the primary and secondary thrusts Wpri, Wsec being controlled, the belt clamping force is controlled such that slipping of the transmission belt 66 is not caused. That is, with the primary and secondary thrusts Wpri, Wsec being controlled, the gear ratio γcvt of the continuously-variable transmission mechanism 24 is controlled to a target gear ratio γcvtt while the transmission belt 66 is prevented from being slipped. It is noted that the primary rotational speed Npri represents a rotational speed of the primary shaft 58 and that the secondary rotational speed Nsec represents a rotational speed of the secondary shaft 62.

In the continuously-variable transmission mechanism 24, when the primary pressure Ppri is increased, the width of the V-shaped groove of the primary pulley 60 is reduced whereby the gear ratio γcvt is reduced. The reduction of the gear ratio γcvt corresponds to a shift-up action performed in the continuously-variable transmission mechanism 24. In the continuously-variable transmission mechanism 24, the lowest gear ratio γmin is provided with the width of the V-shaped groove of the primary pulley 60 being minimized. Within a range of the gear ratio γcvt that can be provided by the continuously-variable transmission mechanism 24, the lowest gear ratio gear ratio γmin is a value of the gear ratio γcvt which makes it possible to maximize the running speed of the vehicle 10. Further, in the continuously-variable transmission mechanism 24, when the primary pressure Ppri is reduced, the width of the V-shaped groove of the primary pulley 60 is increased whereby the gear ratio γcvt is increased. The increase of the gear ratio γcvt corresponds to a shift-down action performed in the continuously-variable transmission mechanism 24. In the continuously-variable transmission mechanism 24, the highest gear ratio γmax is provided with the width of the V-shaped groove of the primary pulley 60 being maximized. Within the range of the gear ratio γcvt that can be provided by the continuously-variable transmission mechanism 24, the highest gear ratio gear ratio γmax is a value of the gear ratio γcvt which makes it possible to minimize the running speed of the vehicle 10. In the continuously-variable transmission mechanism 24, the belt slippage is prevented by the primary thrust Wpri and the secondary thrust Wsec, and the target gear ratio γcvtt is established by a combination of the primary thrust Wpri and the secondary thrust Wsec, rather than by only one of the primary thrust Wpri and the secondary thrust Wsec. The gear ratio γcvt of the continuously-variable transmission mechanism 24 is dependent on a thrust ratio τ (=Wsec/Wpri) of the pulleys 60, 64. Namely, the gear ratio γcvt is changeable by change of the thrust ratio τ. For example, the gear ratio γcvt is increased with increase of the thrust ratio τ.

The output shaft 30 is provided to be coaxial with the secondary shaft 62 and rotatable relative to the secondary shaft 62. The second clutch C2 is provided in a drive-force transmitting path (that corresponds to a part of the above-described second drive-force transmitting path PT2) between the secondary pulley 64 and the output shaft 30. The second drive-force transmitting path PT2 is established with engagement of the second clutch C2. In the drive-force transmitting apparatus 16, with the second drive-force transmitting path PT2 being established, the drive-force transmitting apparatus 16 is placed in its drive-force transmittable state in which the drive force of the engine 12 is transmittable from the input shaft 22 to the output shaft 30 through the continuously-variable transmission mechanism 24. With the second drive-force transmitting path PT2 being cut off by release of the second clutch C2, the drive-force transmitting apparatus 16 is placed in its neutral state in which the drive force is not transmittable.

In the drive-force transmitting apparatus 16, a gear ratio EL of the gear mechanism 28, which is a gear ratio γgear (=input-shaft rotational speed Nin/output-shaft rotational speed Nout) provided in the first drive-force transmitting path PT1, is higher than the above-described highest gear ratio γmax of the continuously-variable transmission mechanism 24 which is the highest gear ratio provided in the second drive-force transmitting path PT2. That is, the gear ratio EL is a value that makes it possible to reduce the running speed of the vehicle 10 more than the highest gear ratio γmax. The gear ratio EL of the gear mechanism 28 corresponds to a first-speed gear ratio γ1 in the drive-force transmitting apparatus 16. The highest gear ratio γmax of the continuously-variable transmission mechanism 24 corresponds to a second-speed gear ratio γ2 in the drive-force transmitting apparatus 16. Thus, any gear ratio provided in the second drive-force transmitting path PT2 is lower than the gear ratio provided in the first drive-force transmitting path PT1. It is noted that the input-shaft rotational speed Nin represents a rotational speed of the input shaft 22 and that the output-shaft rotational speed Nout represents a rotational speed of the output shaft 30.

The vehicle 10 can run in a selected one of the gear running mode and the belt running mode. The gear running mode is a running mode in which the vehicle 10 runs with the drive force being transmitted through the first drive-force transmitting path PT1 that is established in the drive-force transmitting apparatus 16. The belt running mode is a running mode in which the vehicle 10 runs with the drive force being transmitted through the second drive-force transmitting path PT2 that is established in the drive-force transmitting apparatus 16. When forward running of the vehicle 10 is to be made in the gear running mode, the first clutch C1 and the dog clutch D1 are engaged while the second clutch C2 and the first brake B1 are released. When reverse running of the vehicle 10 is to be made in the gear running mode, the first brake B1 and the dog clutch D1 are engaged while the second clutch C2 and the first clutch C1 are released. In the belt running mode, forward running of the vehicle 10 can be made.

The gear running mode is selected to be established when the vehicle 10 runs at a running speed within a relative low speed range or when the vehicle 10 is stopped. The belt running mode is selected to be established when the vehicle 10 runs at a running speed within a relatively high speed range including a middle speed range as well as a high speed range. When the belt running mode is established in the middle speed range, the dog clutch D1 is engaged. When the belt running mode is established in the high speed range, the dog clutch D1 is released, for example, for the purpose of avoiding drag of the gear mechanism 28 and other elements during running of the vehicle 10 in the belt running mode and preventing gears of the gear mechanism 28 and components (such as pinion gears) of the planetary gear device 26*p* from being rotated at high speeds.

The vehicle 10 is provided with the electronic control apparatus 90 as a controller including the control apparatus constructed according to present invention. For example, the electronic control apparatus 90 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 90 is configured to perform, for example, an engine control operation for controlling an output of the engine 12, a shifting control operation and a belt-clamping-force control operation for the continuously-variable transmission mechanism 24, and a hydraulic-pressure control operation for switching the operation state of each of the plurality of engagement devices (C1, B1, C2, D1). The electronic control apparatus 90 may be constituted by two or more control units exclusively assigned to perform different control operations such as the engine control operation and the hydraulic-pressure control operation.

The electronic control apparatus 90 receives various input signals based on values detected by respective sensors provided in the vehicle 10. Specifically, the electronic control apparatus 90 receives: an output signal of an engine speed sensor 70 indicative of an engine rotational speed Ne which is a rotational speed of the engine 12; an output signal of a primary speed sensor 72 indicative of the primary rotational speed Npri which is equivalent to the input-shaft rotational speed Nin; an output signal of a secondary speed sensor 74 indicative of the secondary rotational speed Nsec; an output signal of an output speed sensor 76 indicative of the output-shaft rotational speed Nout which corresponds to the running speed V of the vehicle 10; an output signal of an accelerator-operation amount sensor 78 indicative of an accelerator operation amount θacc which represents an amount of accelerating operation made by a vehicle operator; an output signal of a throttle-opening degree sensor 80 indicative of the throttle opening degree tap; and an output signal of a shift position sensor 82 indicative of an operation position POSsh of a manually-operated shifting member in the form of a shift lever 84 provided in the vehicle 10. Further, the electronic control apparatus 90 generates various output signals which are supplied to various devices such as the engine control device 42 and the hydraulic control unit 46 and which include an engine-control command signal Se for controlling the engine 12, a hydraulic control command signal Scvt for performing hydraulic controls such as controls of the shifting action and the belt clamping force of the continuously-variable transmission mechanism 24, and a hydraulic-control command signal Scbd for performing hydraulic controls such as controls of operation states of the plurality of engagement devices. It is noted that the input-shaft rotational speed Nin (=primary rotational speed Npri) is equivalent to a rotational speed of the turbine impeller 20t of the of the torque converter 20. It is also noted that the primary rotational speed Npri is equivalent to a rotational speed of the primary pulley 60 and that the secondary rotational speed Nsec is equivalent to a rotational speed of the secondary pulley 64.

The shift lever 84 is operable to be placed in a selected one of a plurality of operation positions POSsh that consist of, for example, a parking position P, a reverse position R, a neutral position N and a drive position D. With the shift lever 84 being placed in the parking position P, the drive-force transmitting apparatus 16 is placed in its parking position in which the drive-force transmitting apparatus 16 is placed in its neutral state and rotation of the output shaft 30 is mechanically inhibited (locked). The drive-force transmitting apparatus 16 is placed in the neutral state, for example, by releasing all of the first clutch C1, first brake B1 and second clutch C2. With the shift lever 84 being placed in the reverse position R, the drive-force transmitting apparatus 16 is placed in its reverse drive position for enabling the reverse running of the vehicle 10 in the gear running mode. With the shift lever 84 being placed in the neutral position N, the drive-force transmitting apparatus 16 is placed in its neutral position in which the drive-force transmitting apparatus 16 is placed in its neutral state. With the shift lever 84 being placed in the drive position D, the drive-force transmitting apparatus 16 is placed in its forward drive position for enabling the forward running of the vehicle 10 in the gear running mode, or enabling the forward running of the vehicle 10 in the belt running mode with execution of an automatic shifting control of the continuously-variable transmission mechanism 24.

For performing various control operations in the vehicle 10, the electronic control apparatus 90 includes an engine control means or portion in the form of an engine control portion 92, a transmission shifting control means or portion in the form of a transmission shifting control portion 94, and a state determining means or portion in the form of a state determining portion 96.

The engine control portion 92 calculates a required drive force Fdem, for example, by applying the accelerator operation amount θacc and the running velocity V to a predetermined or stored relationship (e.g., drive force map) that is obtained by experimentation or determined by an appropriate design theory. The engine control portion 92 sets a target engine torque Tet that ensures the required drive force Fdem, and outputs the engine-control command signal Se for controlling the engine 12 so as to obtain the target engine torque Tet. The outputted engine-control command signal Se is supplied to the engine control device 42.

When the operation position POSsh of the shift lever 84 is the parking position P or the neutral position N during stop of the vehicle 10, the transmission shifting control portion 94 supplies, to the hydraulic control unit 46, the hydraulic-control command signal Scbd requesting engagement of the dog clutch D1, in preparation of transition to the gear running mode. When the operation position POSsh is switched from the parking position P or the neutral position N to the drive position D during stop of the vehicle 10, the transmission shifting control portion 94 supplies, to the hydraulic control unit 46, the hydraulic-control command signal Scbd requesting engagement of the first clutch C1, whereby the gear running mode is established to enable forward running of the vehicle 10. When the operation position POSsh is switched from the parking position P or the neutral position N to the reverse position R during stop of the vehicle 10, the transmission shifting control portion 94 supplies, to the hydraulic control unit 46, the hydraulic-control command signal Scbd requesting engagement of the first brake B1, whereby the gear running mode is established to enable reverse running of the vehicle 10.

When the operation position POSsh is the drive position D, the transmission shifting control portion 94 executes a switching control operation for switching the running mode between the gear running mode and the belt running mode. Specifically, the transmission shifting control portion 94 determines whether shifting from one of first and second speed positions to the other is to be executed or not, by applying the running speed V and the accelerator operation amount θacc to a shifting map in which shift-up lines, shift-down lines and hysteresis between each of the shift-up lines and a corresponding one of the shift-down lines are defined. The first speed position corresponds to the above-described gear ratio EL provided in the gear mechanism 28 by which the drive force is to be transmitted through the first drive-force transmitting path PT1 during the gear running mode. The second speed position corresponds to the above-described highest gear ratio γmax that is the highest one of the gear ratios provided in the continuously-variable transmission mechanism 24 by which the drive force is to be transmitted through the second drive-force transmitting path PT2 during the belt running mode. Then, when determining that the shifting is to be executed, the transmission shifting control portion 94 switches the running mode from one of the gear running mode and the belt running mode to the other, so as to execute shifting up or down from one of the first and second speed positions to the other.

When determining that the running mode is to be switched from the gear running mode to the belt running mode so as to execute the shifting up from the first speed position to the second speed position, the transmission shifting control portion 94 supplies, to the hydraulic control unit 46, the hydraulic-control command signal Scbd requesting releasing and engaging actions of the respective first and second clutches C1, C2, so as to perform a so-called "clutch to clutch" shifting operation. As a result of the shifting up from the first speed position to the second speed position, the second drive-force transmitting path PT2 is established in place of the first drive-force transmitting path PT1 in the drive-force transmitting apparatus 16. Thus, the transmission shifting control portion 94 executes a stepped shifting control to release and engage the first and second clutches C1, C2, respectively, so as to cause the drive-force transmitting apparatus 16 to execute the shift-up action by which the selected running mode (i.e., selected state) is switched from the gear running mode (i.e., first state) in which the first drive-force transmitting path PT1 is established to the belt running mode (i.e., second state) in which the second drive-force transmitting path PT2 is established. In the following description relating to the present embodiment, the shift-up action, which is executed by the drive-force transmitting apparatus 16 to switch the selected running mode from the gear running mode to the belt running mode, will be referred to as "stepped shift-up action".

When determining that the running mode is to be switched from the belt running mode to the gear running mode so as to execute the shifting down from the second speed position to the first speed position, the transmission shifting control portion 94 supplies, to the hydraulic control unit 46, the hydraulic-control command signal Scbd requesting releasing and engaging actions of the respective second and first clutches C2, C1, so as to perform the clutch to clutch shifting operation. As a result of the shifting down from the second speed position to the first speed position, the first drive-force transmitting path PT1 is established in place of the second drive-force transmitting path PT2 in the drive-force transmitting apparatus 16. Thus, the transmission shifting control portion 94 executes a stepped shifting control to release and engage the second and first clutches C2, C1, respectively, so as to cause the drive-force transmitting apparatus 16 to execute the shift-down action by which the selected running mode (i.e., selected state) is switched from the belt running mode (i.e., second state) in which the second drive-force transmitting path PT2 is established to the gear running mode (i.e., first state) in which the first drive-force transmitting path PT1 is established. In the following description relating to the present embodiment, the shift-down action, which is executed by the drive-force transmitting apparatus 16 to switch the selected running mode from the belt running mode to the gear running mode, will be referred to as "stepped shift-down action".

In the switching control operation for switching the running mode between the gear running mode and the belt running mode, the switching between the first and second drive-force transmitting paths PT1, PT2 is made by only the above-described clutch to clutch shifting operation for making a torque transfer via an transition state in which the dog clutch D1 is engaged in the belt running mode in the middle speed range, so that the switching control operation is performed with a shifting shock being restrained.

For executing a shifting action in the continuously-variable transmission mechanism 24 during the belt running mode, the transmission shifting control portion 94 supplies, to the hydraulic control unit 46, the hydraulic-control command signal Scvt for controlling the primary pressure Ppri and the secondary pressure Psec such that the target gear ratio γcvtt is provided in the continuously-variable transmission mechanism 24 while the belt slippage is not caused in the continuously-variable transmission mechanism 24.

Specifically, the transmission shifting control portion 94 calculates a target primary rotational speed Nprit, by applying the accelerator operation amount θacc and the running speed V to a predetermined relationship such as a CVT shifting map. The transmission shifting control portion 94 calculates a target gear ratio γcvtt (=Nprit/Nsec), based on the target primary rotational speed Nprit. The transmission shifting control portion 94 calculates an estimated value of the engine torque Te, by applying the throttle opening degree tap and the engine rotational speed Ne to a predetermined relationship such as an engine torque map. The transmission shifting control portion 94 calculates a turbine torque Tt, based on the estimated value of the engine torque Te and a predetermined relationship such as characteristic of the torque converter 20. The transmission shifting control portion 94 uses the turbine torque Tt as a primary input torque Tpri that is an input torque inputted to the primary pulley 60. The primary input torque Tpri is a torque that is to act on the primary shaft 58. The transmission shifting control portion 94 calculates a thrust ratio τ for establishing a target gear ratio γcvtt, by applying the target gear ratio γcvtt and a torque ratio to a predetermined relationship such as a torque ratio map, wherein the torque ratio is a ratio (=Tpri/Tprilim) of the calculated primary input torque Tpri to a predetermined limit torque Tprilim that can be inputted to the primary pulley 60. The transmission shifting control portion 94 calculates a target primary thrust Wprit and a target secondary thrust Wsect that cooperate with each other to establish the thrust ratio τ. In this instance, if one of the target primary thrust Wprit and the target secondary thrust Wsect is determined, the other can be determined based on the thrust ratio τ that establishes the target gear ratio γcvtt. The transmission shifting control portion 94 converts the target primary thrust Wprit and the target secondary thrust Wsect into a target primary pressure Pprit (=Wprit/pressure receiving area) and a target secondary pressure Psect (=Wsect/pressure receiving area), respectively. The transmission shifting control portion 94 supplies, to the hydraulic control unit 46, the hydraulic-control command signal Scvt by which the primary pressure Ppri and the secondary pressure Psec is controlled to the target primary pressure Pprit and the target secondary pressure Psect, respectively. The hydraulic control unit 46 regulates the primary pressure Ppri and the secondary pressure Psec, by operating solenoid valves in accordance with the hydraulic-control command signal Scvt. In the above description relating to the shifting control of the continuously-variable transmission mechanism 24, the thrusts, which are required for enabling the gear ratio γcvt to be held at the target gear ratio γcvtt, have been discussed for the convenience of description. In process of a shifting action executed in the continuously-variable transmission mechanism 24, actually, thrusts required for executing a desired shift-up action or shift-down action are added to the thrusts required for enabling the gear ratio γcvt to be held at the target gear ratio γcvtt.

Each of the target primary thrust Wprit and the target secondary thrust Wsect is calculated by taking account of a required thrust that is minimally required for preventing the belt slippage in the continuously-variable transmission mechanism 24. The required thrust is a limit thrust that corresponds to a thrust shortly before occurrence of the belt slippage in the continuously-variable transmission mechanism 24.

The transmission shifting control portion 94 sets a primary limit thrust Wprilim that is the limit thrust for the primary pulley 60 and a secondary limit thrust Wseclim that is the limit thrust for the secondary pulley 64, by using equations (1) and (2) given below. In the equations (1) and (2), "α" represents a sheave angle of the pulleys 60, 64, "p" represents a coefficient of friction generating between the sheave and the element of the belt, "Rpri" represents ½ of the belt winding diameter (effective diameter) of the primary pulley 60, which is calculated based on the gear ratio γcvt of the continuously-variable transmission mechanism 24, "γcvt*Tpri" represents a torque inputted to the secondary pulley 64, and "Rsec" represents ½ of the belt winding diameter (effective diameter) of the secondary pulley 64, which is calculated based on the gear ratio γcvt of the continuously-variable transmission mechanism 24. It is noted that the sheave angle α is an angle defined between a conical surface of each of the pulleys 60, 64 and a plane perpendicular to an axis of the each of the pulleys 60, 64.

$$Wprilim=(Tpr*\cos \alpha)/(2*\mu*Rpri) \quad (1)$$

$$Wseclim=(\gamma cvt*Tpri*\cos \alpha)/(2*\mu*Rsec) \quad (2)$$

The transmission shifting control portion 94 calculates a secondary shifting-control thrust Wsecsh (=τ*Wprilim) as a thrust that is required to be applied to the secondary pulley 64 for the shift control, based on the primary limit thrust Wprilim and the thrust ratio τ that is required to establish the target gear ratio γcvtt. The transmission shifting control portion 94 sets, as a target secondary thrust Wsect, a larger one of the secondary limit thrust Wseclim and the secondary shifting-control thrust Wsecsh. The transmission shifting control portion 94 calculates the target primary thrust Wprit (=Wsect/h), based on the target secondary thrust Wsect and the thrust ratio r that is required to establish the target gear ratio γcvtt.

In view of the controllability, it is preferable that each of the above-described stepped shift-up action and stepped shift-down action of the drive-force transmitting apparatus 16 is executed, by the stepped shifting control, between the gear ratio EL of the gear mechanism 28 and a predetermined value of the continuously-variable gear ratio γcvt of continuously-variable transmission mechanism 24, as in a known stepped-variable transmission in which a stepped shifting action is executed between two fixed gear ratios provided in respective predetermined two gear positions. In the present embodiment, for restraining an amount of change of the primary rotational speed Npri and maintain a consistency of the drive force during the stepped shifting control, the above-described predetermined value of the continuously-variable gear ratio γcvt of continuously-variable transmission mechanism 24 upon execution of the stepped shift-up action or stepped shift-down action is a predetermined high gear ratio value (that may be referred also to as "predetermined low speed-side gear ratio value") γlowf, which is in a given range (in which the gear ratio γcvt is variable) and which is relatively close or adjacent to the gear ratio EL of the gear mechanism 28. With the amount of change of the primary rotational speed Npri being restrained, an amount of heat generation upon engagement of the second clutch C2 can be restrained, for example. In the present embodiment, the predetermined high gear ratio value γlowf is the highest gear ratio (predetermined highest gear ratio value) γmax.

Where the stepped shift-down action of the drive-force transmitting apparatus 16 is a power-on shift-down action that is determined to be executed as a result of increase of a required drive force (i.e., a required magnitude of the drive force), for example, increase of the accelerator operation amount θacc, it is preferable that a higher priority is given to an acceleration responsiveness rather than to a shock reduction. To this end, where the stepped shift-down action is to be executed is the power-on shift-down action, the transmission shifting control portion 94 causes the drive-force transmitting apparatus 16 to execute the stepped shift-down action even when the gear ratio γcvt of the continuously-variable transmission mechanism 24 is not the highest gear ratio value γmax. In this instance, the transmission shifting control portion 94 controls the continuously-variable transmission mechanism 24 such that the gear ratio γcvt is increased to the highest gear ratio value γmax while the stepped shift-down action is executed in the drive-force transmitting apparatus 16. Thus, the transmission shifting control portion 94 executes a so-called "lap-down control" by which the stepped shift-down action is executed in the drive-force transmitting apparatus 16 together with (or substantially concurrently with) execution of a stepless shift-down action that is executed to increase the continuously-variable gear ratio γcvt of the continuously-variable transmission mechanism 24 to the highest gear ratio value γmax. The stepped shift-down action executed in the drive-force transmitting apparatus 16 in execution of the lap-down control, is the power-on shift-down action.

By the way, there is a case where the power-off shift-up action as the stepped shift-up action is determined to be executed in the drive-force transmitting apparatus 16 as a result of reduction of the required drive force (for example, reduction of the accelerator operation amount θacc), during execution of the lap-down control. In such a case, if the stepped shift-up action is not executed until the gear ratio γcvt of the continuously-variable transmission mechanism 24 is increased to the highest gear ratio value γmax, the engine 12 has a behavior in which the engine rotational speed Ne is temporarily kept at a high value whereby an uncomfortable feeling could be given to an operator of the vehicle 10. That is, when releasing the accelerator pedal, the operator expects reduction of the engine rotational speed Ne. However, if the stepped shift-up action is not initiated, the engine 12 has a behavior in which the engine rotational speed Ne is increased, by the stepped shift-down action, to a value corresponding to a synchronized speed at the gear ratio EL of the gear mechanism 28 whereby an uncomfortable feeling could be given to an operator of the vehicle 10.

In a normal case, the transmission shifting control portion 94 causes the drive-force transmitting apparatus 16 to execute the stepped shift-up action when the gear ratio γcvt of the continuously-variable transmission mechanism 24 is the highest gear ratio value γmax. Additionally, where the stepped shift-up action is determined to be executed when the lap-down control is being executed, there is a case in which the transmission shifting control portion 94 causes the drive-force transmitting apparatus 16 to execute the stepped shift-up action even when the gear ratio γcvt of the continuously-variable transmission mechanism 24 is not the highest gear ratio value γmax.

Specifically, when the transmission shifting control portion 94 determines that the stepped shift-up action is to be executed in the drive-force transmitting apparatus 16, the state determining portion 96 determines whether a state of the drive-force transmitting apparatus 16 upon determination for execution of the stepped shift-up action satisfies a first condition including a requirement that the continuously-variable gear ratio γcvt of the continuously-variable transmission mechanism 24 is equal to a first gear ratio value γcvtf1 or higher than the first gear ratio value γcvtf1. That is, in this instance, the state determining portion 96 determines whether the gear ratio γcvt of the continuously-variable transmission mechanism 24 is not lower than the first gear ratio value γcvtf1, which corresponds to a predetermined lower limit gear ratio value that is minimally required to determine that the gear ratio γcvt of the continuously-variable transmission mechanism 24 is the highest gear ratio value γmax.

Further, when the transmission shifting control portion 94 determines that the stepped shift-up action is to be executed in the drive-force transmitting apparatus 16, the state determining portion 96 determines whether the state of the drive-force transmitting apparatus 16 satisfies a second condition including a requirement that the lap-down control is executed by the transmission shifting control portion 94 and another requirement that the gear ratio γcvt of the continuously-variable transmission mechanism 24 is equal to a second gear ratio value γcvtf2 or higher than the second gear ratio value γcvtf2. That is, in this instance, the state determining portion 96 determines whether the gear ratio γcvt of the continuously-variable transmission mechanism 24 is not lower than the second gear ratio value γcvtf2, with the lap-down control being executed. It is noted that the second gear ratio value γcvtf2 is lower than the first gear ratio value γcvtf1. In the present embodiment, the second gear ratio value γcvtf2 corresponds to a predetermined lower limit gear ratio value that is minimally required to permit execution of the lap-down control, for example, in view of consistency with the lap-down control.

A state in which "the lap-down control is executed" is interpreted to encompass not only an execution state in which the lap-down control is being actually executed but also a post-execution state in which execution of the lap-down control has been terminated without a length of time, which has elapsed since termination of the execution of the lap-down control, exceeding a predetermined upper limit value that makes it possible to regard that the lap-down control is being actually executed. Thus, the state in which "the lap-down control is executed" is interpreted to encompass also the post-execution state, because the gear ratio γcvt of the continuously-variable transmission mechanism 24 is likely to not yet have become the highest gear ratio value γmax in the post-execution state, due to a variation. Further, the post-execution state is limited to a state immediately after the execution, in which the length of time having elapsed since the termination of the execution of the lap-down control has not yet exceeded the predetermined upper limit value that makes it possible to regard that the lap-down control is being actually executed, because this limitation is considered preferable to execute a control related to the lap-down control.

In a case in which the transmission shifting control portion 94 determines that the stepped shift-up action is to be executed in the drive-force transmitting apparatus 16 and the state determining portion 96 determines that the state of the drive-force transmitting apparatus 16 satisfies the above-described first condition (including the requirement that the gear ratio γcvt of the continuously-variable transmission mechanism 24 is equal to the first gear ratio value γcvtf1 or higher than the first gear ratio value γcvtf1), the transmission shifting control portion 94 causes the drive-force transmitting apparatus 16 to execute the stepped shift-up action. This case corresponds to the above-described normal case in which the transmission shifting control portion 94 normally causes the drive-force transmitting apparatus 16 to execute the stepped shift-up action when the gear ratio γcvt of the continuously-variable transmission mechanism 24 is the highest gear ratio value γmax.

In another case in which the transmission shifting control portion 94 determines that the stepped shift-up action is to be executed in the drive-force transmitting apparatus 16 and the state determining portion 96 determines that the state of the drive-force transmitting apparatus 16 satisfies the above-described second condition (including the requirement that the lap-down control is executed by the transmission shifting control portion 94 and the other requirement that the gear ratio γcvt of the continuously-variable transmission mechanism 24 is equal to the second gear ratio value γcvtf2 or higher than the second gear ratio value γcvtf2), the transmission shifting control portion 94 causes the drive-force transmitting apparatus 16 to execute the stepped shift-up action. In this case, if the stepped shift-down action is still being executed in the drive-force transmitting apparatus 16 in the lap-down control, the transmission shifting control portion 94 causes the drive-force transmitting apparatus 16 to execute the stepped shift-up action in place of the stepped shift-down action.

In a case (such as the above-described another case) in which the stepped shift-up action is executed with the gear ratio γcvt of the continuously-variable transmission mechanism 24 being lower than the highest gear ratio value γmax, a torque inputted to the second clutch C2 is made smaller than in a case in which the stepped shift-up action is executed with the gear ratio γcvt of the continuously-variable transmission mechanism 24 corresponding to the highest gear ratio value γmax. Therefore, if the stepped shift-up action is executed in the former case (such as the above-described case) in the same manner as in the latter case, the engaging pressure applied to the second clutch C2 would be larger than necessary whereby the second clutch C2 could be engaged too quickly.

Therefore, where the transmission shifting control portion 94 determines that the stepped shift-up action is to be executed in the drive-force transmitting apparatus 16 and the state determining portion 96 determines that the state of the drive-force transmitting apparatus 16 satisfies the above-described second condition, the transmission shifting control portion 94 causes the drive-force transmitting apparatus 16 to execute the stepped shift-up action, with the engaging pressure applied to the second clutch C2 being compensated such that the engaging pressure is made lower as the gear ratio γcvt of the continuously-variable transmission mechanism 24 is lower.

Where the stepped shift-up action is a power-off shift-up action that is determined to be executed as a result of reduction of the required drive force (for example, reduction of the accelerator operation amount θacc), the input-shaft rotational speed Nin is naturally reduced, by reducing the engaging pressure applied to the first clutch C1 as a releasing engagement device, toward a synchronized speed that is to be established after completion of the shift-up action while the second clutch C2 as an engaging engagement device is placed in a synchronized state in which a rotational speed difference ΔNc2 of the second clutch C2 is made small. Therefore, in this case, an increase of the engaging pressure applied to the second clutch C2 may be made after the second clutch C2 is placed in the synchronized state. That is, where the stepped shift-up action is a power-off shift-up action that is determined to be executed as a result of reduction of the required drive force, the second clutch C2 is engaged by gradually increasing the engaging pressure applied to the second clutch C2 after the rotational speed difference ΔNc2 of the second clutch C2 becomes not larger than a predetermined first difference value $\Delta Nc2/1$ that makes it possible to determine that the second clutch C2 is in the synchronized state. In the following description relating to the present embodiment, the rotational speed difference $\Delta Nc2$ of the second clutch C2 will be referred to as "C2 rotational speed difference $\Delta Nc2$".

Where the transmission shifting control portion 94 determines that the power-off shift-up action as the stepped shift-up action is to be executed in the drive-force transmitting apparatus 16 and the state determining portion 96 determines that the state of the drive-force transmitting apparatus 16 satisfies the above-described second condition, the transmission shifting control portion 94 causes the drive-force transmitting apparatus 16 to execute the power-off shift-up action, such that a rate of the gradual increase of the engaging pressure applied to the second clutch C2 is made lower as the gear ratio $\gamma$cvt of the continuously-variable transmission mechanism 24 is lower whereby the engaging pressure applied to the second clutch C2 is compensated to be lower as the gear ratio $\gamma$cvt of the continuously-variable transmission mechanism 24 is lower.

Where the stepped shift-up action is executed in the drive-force transmitting apparatus 16 without the gear ratio $\gamma$cvt of the continuously-variable transmission mechanism 24 corresponding to the highest gear ratio value $\gamma$max, there is a possibility that the second clutch C2 could not be easily placed in the synchronized state or the C2 rotational speed difference $\Delta Nc2$ could not be easily reduced. Therefore, where the stepped shift-up action is executed as a result of satisfaction of the above-described second condition (including the requirement that the lap-down control is executed by the transmission shifting control portion 94 and the other requirement that the gear ratio $\gamma$cvt of the continuously-variable transmission mechanism 24 is equal to the second gear ratio value $\gamma$cvtf2 or higher than the second gear ratio value $\gamma$cvtf2), the transmission shifting control portion 94 causes the continuously-variable transmission mechanism 24 to continuously execute the stepless shift-down action by which the gear ratio $\gamma$cvt of the continuously-variable transmission mechanism 24 is increased to the highest gear ratio value $\gamma$max.

Figure 2:
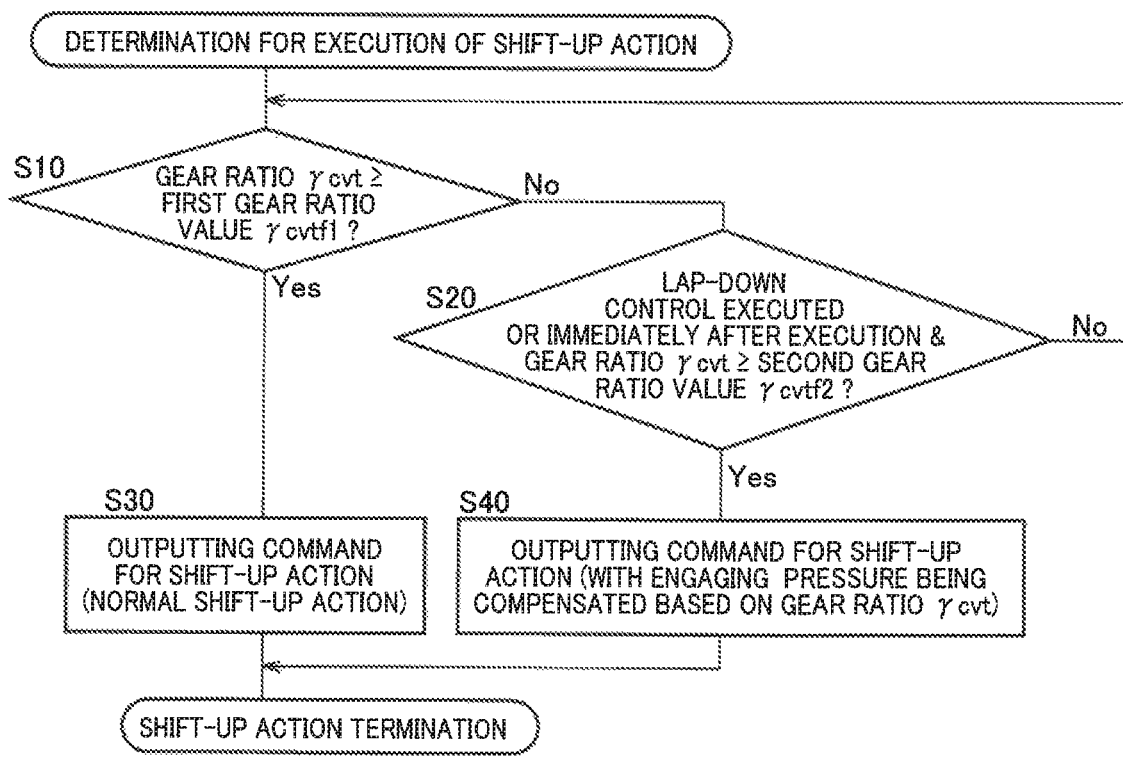
FIG. 2 is a flow chart showing a main part of a control routine executed by the control apparatus, namely, a control routine that is executed for reducing an uncomfortable feeling given to an operator of the vehicle, when a stepped shift-up action is executed in the drive-force transmitting apparatus.
Figure 3:
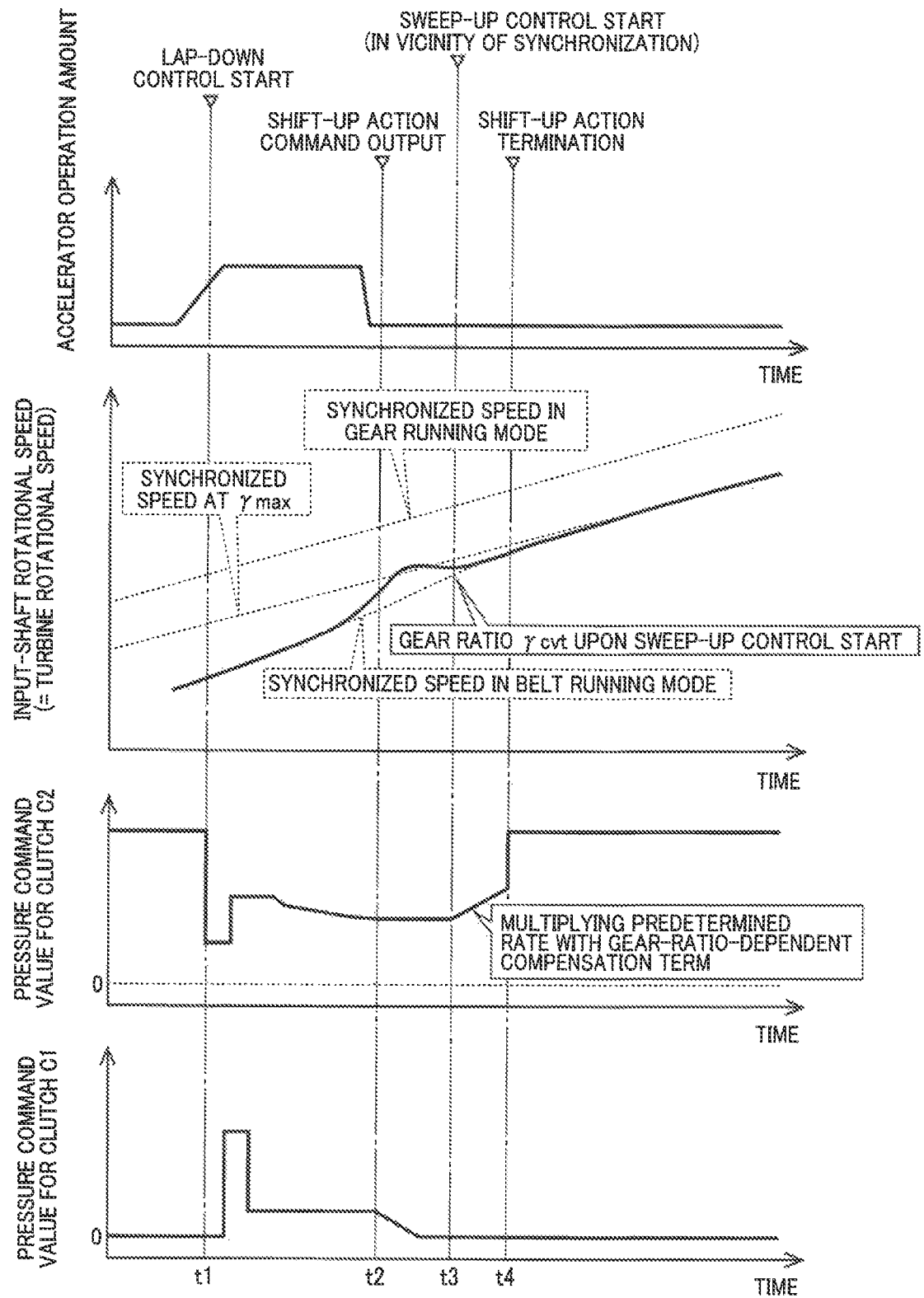
FIG. 3 is a time chart for explaining, by way of example, a case where the control routine of FIG. 2 is executed.

FIG. 2 is a flow chart showing a main part of a control routine executed by the electronic control apparatus 90, namely, a control routine that is executed for reducing an uncomfortable feeling given to an operator of the vehicle 10, for example, when the stepped shift-up action is determined to be executed in the drive-force transmitting apparatus 16. FIG. 3 is a time chart for explaining, by way of example, a case where the control routine of FIG. 2 is executed.

The control routine shown in FIG. 2 is initiated with step S10 corresponding to function of the state determining portion 96, which is implemented to determine whether the gear ratio $\gamma$cvt of the continuously-variable transmission mechanism 24 is equal to or higher than the first gear ratio value $\gamma$cvtf1, namely, determine whether the state of the drive-force transmitting apparatus 16 (upon determination for execution of the stepped shift-up action) satisfies the above-described first condition or not. When a negative determination is made at step S10, the control flow goes to step S20 corresponding to function of the state determining portion 96, which is implemented to determine whether the gear ratio $\gamma$cvt of the continuously-variable transmission mechanism 24 is equal to or higher than the second gear ratio value $\gamma$cvtf2 in a state in which the lap-down control being executed or in the above-described state immediately after the execution of the lap-down control, namely, determine whether the state of the drive-force transmitting apparatus 16 (upon determination for execution of the stepped shift-up action) satisfies the above-described second condition or not. When a negative determination is made at step S20, too, the control flow goes back to step S10. When an affirmative determination is made at step S10, step S30 corresponding to function of the transmission shifting control portion 94 is implemented to output the hydraulic-control command signal Scbd requesting the stepped shift-up action to be executed in a normal manner. When an affirmative determination is made at step S20, step S40 corresponding to function of the transmission shifting control portion 94 is implemented to output the hydraulic-control command signal Scbd requesting the stepped shift-up action to be executed with the engaging pressure of the second clutch C2 being compensated depending on the gear ratio $\gamma$cvt of the continuously-variable transmission mechanism 24.

FIG. 3 shows, by way of example, a case in which the stepped shift-up action is determined to be executed during execution of the lap-down control. In FIG. 3, a point t1 of time indicates a point of time at which the lap-down control is initiated. The input-shaft rotational speed Nin is increased toward the synchronized speed at the highest gear ratio value $\gamma$max, along the synchronized speed in the belt running mode, owing to the stepless shift-down action executed in the continuously-variable transmission mechanism 24. As the power-on shift-down action executed in the drive-force transmitting apparatus 16 is progressed, the input-shaft rotational speed Nin is increased toward the synchronized speed in the gear running mode, away from the synchronized speed in the belt running mode. (See a stage from the point t1 of time to a point t2 of time.) A point t2 of time indicates a point of time at which the stepped shift-up action is determined to be executed in the drive-force transmitting apparatus 16 in response to reduction of the accelerator operation amount $\theta$acc and then the hydraulic-control command signal Scbd requesting the stepped shift-up action to be executed in the drive-force transmitting apparatus 16 is outputted. During execution of the stepped shift-up action, the stepless shift-down action is continued to be executed whereby the synchronized speed of the input-shaft rotational speed Nin in the belt running mode is increased toward the synchronized speed of the input-shaft rotational speed Nin at the highest gear ratio value $\gamma$max. Then, the input-shaft rotational speed Nin, which had been increased with progress of the power-on shift-down action in the drive-force transmitting apparatus 16, is reduced naturally by reduction of the accelerator operation amount $\theta$acc. (See a stage from the point t2 of time to a point t3 of time.) When the input-shaft rotational speed Nin becomes to be close to the synchronized speed in the belt running mode, namely, when the second clutch C2 is placed almost in the synchronized state, a sweep-up control is initiated whereby the engaging pressure applied to the second clutch C2 is gradually increased, as seen at the point t3 of time. In this sweep-up control, the engaging pressure applied to the second clutch C2 is controlled based on the gear ratio $\gamma$cvt of the continuously-variable transmission mechanism 24 at a point of time at which the sweep-up control is initiated. For example, in the sweep-up control, the engaging pressure applied to the second clutch C2 is increased at a rate that is obtained by multiplying a predetermined rate with a gear-ratio-dependent compensation term that is dependent on the gear ratio $\gamma$cvt of the continuously-variable transmission mechanism 24, as seen at a stage from the point t3 of time to the point t4 of time. For example, the gear-ratio-dependent compensation term is set to 1 when the gear ratio $\gamma$cvt of the continuously-variable transmission mechanism 24 corresponds to the highest gear ratio value γmax, and is made smaller as the gear ratio γcvt is smaller. The point t4 of time indicates a point of time at which the stepped shift-up action is terminated.

When the lap-down control is being executed, the gear ratio γcvt of the continuously-variable transmission mechanism 24 is less likely to be not lower than the first gear ratio value γcvtf1. However, in the present embodiment, the drive-force transmitting apparatus 16 is caused to execute the shift-up action not only when the above-described first condition is satisfied but also the above-described second condition is satisfied, wherein the second condition includes the requirement that the lap-down control is executed and the requirement that the gear ratio γcvt of the continuously-variable transmission mechanism 24 is not lower than the second gear ratio value γcvtf2 (that is lower than the first gear ratio value γcvtf1). Thus, when the lap-down control is being executed, there is a case in which the shift-up action is executed even if the gear ratio γcvt of the continuously-variable transmission mechanism 24 is lower than the first gear ratio value γcvtf1, for thereby making it possible to reduce an uncomfortable feeling given to the vehicle operator when the shift-up action is executed in the drive-force transmitting apparatus 16.

In the present embodiment, the predetermined high gear ratio value γlowf is the predetermined highest gear ratio value γmax of the gear ratio γcvt of the continuously-variable transmission mechanism 24. Thus, the execution of the lap-down control facilitates a preparation for next execution of the stepped shift-up action in the drive-force transmitting apparatus 16.

When the lap-down control is being executed, the gear ratio γcvt of the continuously-variable transmission mechanism 24 is less likely to have become the highest gear ratio value γmax. However, in the present embodiment, the first gear ratio value γcvtf1 is the predetermined first lower limit gear ratio value that is minimally required to determine that the gear ratio γcvt of the continuously-variable transmission mechanism 24 corresponds to the highest gear ratio value γmax. Thus, there is a case in which the shift-up action is executed even without the gear ratio γcvt of the continuously-variable transmission mechanism 24 having become the predetermined high gear ratio value γlowf.

In the present embodiment, the second gear ratio value γcvtf2 is the predetermined second lower limit gear ratio value of the gear ratio γcvt of the continuously-variable transmission mechanism 24, which is minimally required to permit execution of the lap-down control. Thus, when the shift-up action is determined to be executed during execution of the lap-down control, the stepped shift-up action can be more likely to be permitted to be executed in the drive-force transmitting apparatus 16.

When the lap-down control is being executed, the gear ratio γcvt of the continuously-variable transmission mechanism 24 is less likely to be not lower than the first gear ratio value γcvtf1. However, in the present embodiment, it is determined that the lap-down control is executed when the drive-force transmitting apparatus 16 is in a state in which the lap-down control is being actually executed and also when the drive-force transmitting apparatus 16 is in a state in which execution of the lap-down control has been terminated without a length of time, which has elapsed since termination of the execution of the lap-down control, exceeding a predetermined upper limit value that makes it possible to regard that the lap-down control is being actually executed. Thus, when the lap-down control is being executed, there is a case in which the shift-up action is executed in the drive-force transmitting apparatus 16 even if the gear ratio γcvt of the continuously-variable transmission mechanism 24 is lower than the first gear ratio value γcvtf1.

In the present embodiment, the stepped shift-up action, which is determined to be executed during execution of the lap-down control, is executed with the engaging pressure (that is applied to the second clutch C2) being made lower as the gear ratio γcvt of the continuously-variable transmission mechanism 24 is lower. It is therefore possible to reduce a shock caused upon engagement of the second clutch C2.

In the present embodiment, the stepped shift-up action, which is determined to be executed during execution of the lap-down control, is executed such that the rate of gradual increase of the engaging pressure (that is applied to the second clutch C2) is made lower as the gear ratio γcvt of the continuously-variable transmission mechanism 24 (upon initiation of the gradual increase of the engaging pressure) is lower, whereby the engaging pressure is made lower as the gear ratio γcvt of the continuously-variable transmission mechanism 24 is lower. It is therefore possible to appropriately reduce the shock caused upon engagement of the second clutch C2.

In the present embodiment, when the stepped shift-up action, which is determined to be executed during execution of the lap-down control, is executed, the shift-down action is continuously executed to increase the gear ratio γcvt of the continuously-variable transmission mechanism 24 toward the highest gear ratio value γmax. It is therefore possible to easily place the second clutch C2 into the synchronized state or to easily reduce the C2 rotational speed difference ΔNc2.

In the present embodiment, the stepped shift-down action, which is executed in execution of the lap-down control, is the power-on shift-down action. Thus, since the power-on shift-down action could be executed even without the the gear ratio γcvt of the continuously-variable transmission mechanism 24 corresponding to the highest gear ratio value γmax, a higher priority can be given to a shock reduction rather than to an acceleration responsiveness.

There will be described another embodiment of this invention. The same reference signs as used in the above-described first embodiment will be used in the following embodiment, to identify the functionally corresponding elements, and descriptions thereof are not provided.

Second Embodiment

In the lap-down control executed in the above-described first embodiment, due to a limitation in control which could be caused by, for example, a shortage of amount of flow of the working fluid, the stepless shift-down action, by which the gear ratio γcvt of the continuously-variable transmission mechanism 24 is increase to the highest gear ratio value γmax, could not be satisfactorily performed. For example, there could be a situation in which the gear ratio γcvt is not increased to the highest gear ratio value γmax in the continuously-variable transmission mechanism 24, and even a situation in which the gear ratio γcvt is reduced as if a shift-up action were intended to be executed in the continuously-variable transmission mechanism 24. If it is determined that the lap-down control is executed even with such a situation in the execution of the stepless shift-down action in the continuously-variable transmission mechanism 24, the stepped shift-up action could be executed in the drive-force transmitting apparatus 16, with the C2 rotational speed difference ΔNc2 being larger than in a case in which the stepless shift-down action is satisfactorily performed in the continuously-variable transmission mechanism 24. If the stepped shift-up action is executed with the C2 rotational speed difference ΔNc2 being considerably large, the second clutch C2 could be heated by a degree exceeding a reference limit.

In this second embodiment, in a case in which the stepped shift-up action is determined to be executed during execution of the lap-down control, the transmission shifting control portion 94 is configured to cause the drive-force transmitting apparatus 16 to execute the stepped shift-up action as long as the C2 rotational speed difference ΔNc2 is within a range by which the second clutch C2 is heated by a tolerable degree, for restraining reduction of durability of the second clutch C2 while reducing an uncomfortable feeling given to the operator.

Specifically, the state determining portion 96 determines whether the C2 rotational speed difference ΔNc2 is smaller than a predetermined second difference value ΔNc2f2, which could cause the second clutch C2 to be heated by an intolerable high degree.

That is, in this second embodiment, the second condition includes a requirement that the C2 rotational speed difference ΔNc2 is smaller than the predetermined second difference value ΔNc2f2, in addition to the above-described requirements that the lap-down control is executed by the transmission shifting control portion 94 and that the gear ratio γcvt of the continuously-variable transmission mechanism 24 is equal to the second gear ratio value γcvtf2. Thus, where the transmission shifting control portion 94 determines that the stepped shift-up action is to be executed in the drive-force transmitting apparatus 16 and the state determining portion 96 determines that the state of the state of the drive-force transmitting apparatus 16 satisfies the second condition including the above-described three requirements, the transmission shifting control portion 94 causes the drive-force transmitting apparatus 16 to execute the stepped shift-up action. On the other hand, when the state determining portion 96 determines that the C2 rotational speed difference ΔNc2 is not smaller than the second difference value ΔNc2f2, the transmission shifting control portion 94 does not cause the drive-force transmitting apparatus 16 to execute the stepped shift-up action, until the state determining portion 96 determines that the C2 rotational speed difference ΔNc2 is smaller than the second difference value ΔNc2f2, namely, until all of the requirements of the second condition are satisfied.

Figure 4:
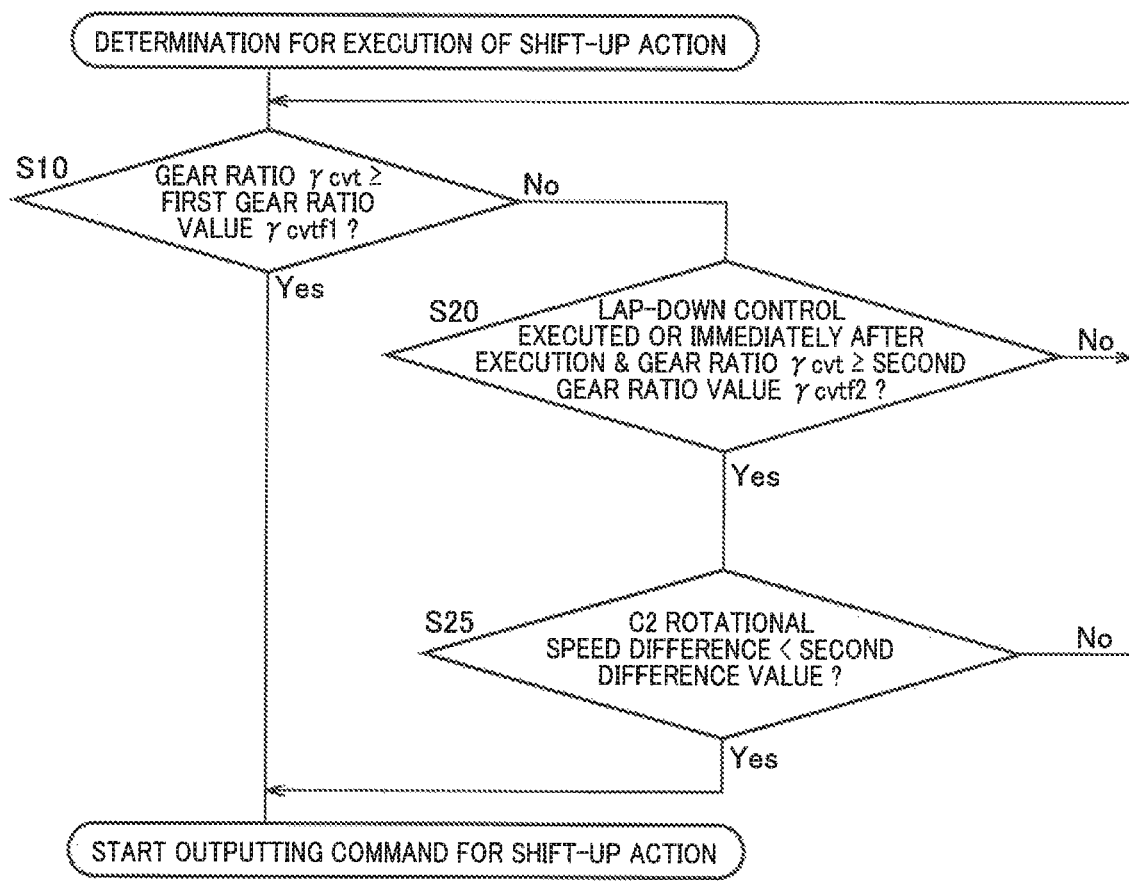
FIG. 4 is a flow chart showing a main part of a control routine executed by the control apparatus, namely, a control routine that is executed for reducing an uncomfortable feeling given to an operator of the vehicle, when the stepped shift-up action is executed in the drive-force transmitting apparatus, wherein the control routine is different from the control routine of FIG. 2.
Figure 5:
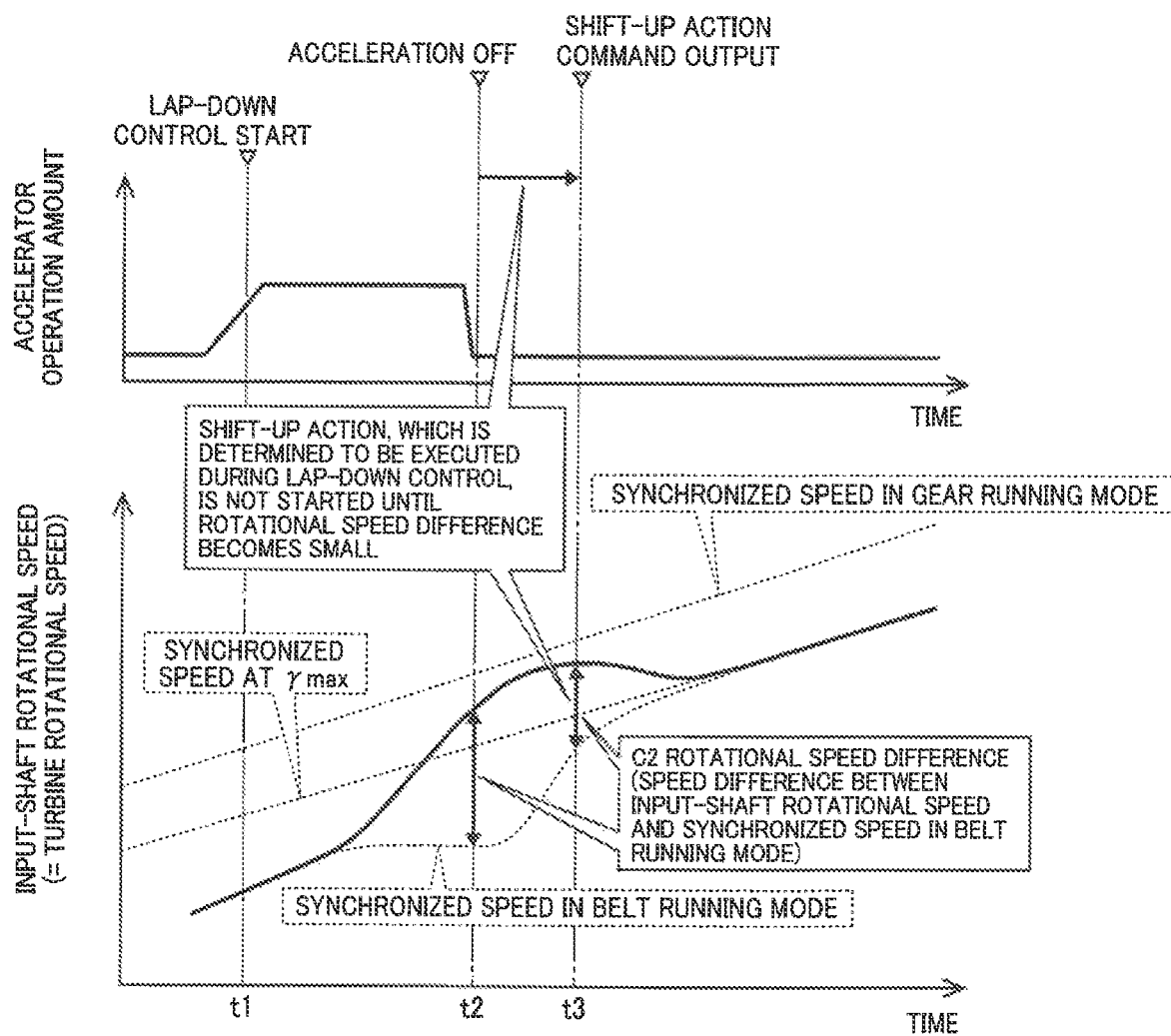
FIG. 5 is a time chart for explaining, by way of example, a case where the control routine of FIG. 4 is executed.

FIG. 4 is a flow chart showing a main part of a control routine executed by the electronic control apparatus 90, namely, a control routine that is executed for reducing an uncomfortable feeling given to an operator of the vehicle 10, for example, when the stepped shift-up action is determined to be executed in the drive-force transmitting apparatus 16. FIG. 5 is a time chart for explaining, by way of example, a case where the control routine of FIG. 4 is executed.

The control routine shown in FIG. 4 is initiated with step S10 corresponding to function of the state determining portion 96, which is implemented to determine whether the gear ratio γcvt of the continuously-variable transmission mechanism 24 is equal to or higher than the first gear ratio value γcvtf1, namely, determine whether the state of the drive-force transmitting apparatus 16 (upon determination for execution of the stepped shift-up action) satisfies the above-described first condition or not. When a negative determination is made at step S10, the control flow goes to step S20 corresponding to function of the state determining portion 96, which is implemented to determine whether the gear ratio γcvt of the continuously-variable transmission mechanism 24 is equal to or higher than the second gear ratio value γcvtf2 in a state in which the lap-down control being executed or in the state immediately after the execution of the lap-down control. When an affirmative determination is made at step S20, step S25 corresponding to function of the state determining portion 96 is implemented to determine whether the C2 rotational speed difference ΔNc2 is smaller than the second difference value ΔNc2f2. That is, in steps S20 and S25, it is determined whether the state of the drive-force transmitting apparatus 16 (upon determination for execution of the stepped shift-up action) satisfies the above-described second condition (including the three requirements) or not. When a negative determination is made at step S20, and when a negative determination is made at step S25, the control flow goes back to step S10. When an affirmative determination is made at step S10, the hydraulic-control command signal Scbd requesting the stepped shift-up action to be executed starts to be outputted. That is, when the affirmative determination is made at step S10, the control flow goes to a step corresponding to step S30, which is described above in the first embodiment and which is shown in FIG. 2. When an affirmative determination is made at step S25, the hydraulic-control command signal Scbd requesting the stepped shift-up action to be executed starts to be outputted. That is, when the affirmative determination is made at step S25, the control flow goes to a step corresponding to step S40, which is described above in the first embodiment and which is shown in FIG. 2. However, in this second embodiment, at the step corresponding to step S40, the compensation of the engaging pressure of the second clutch C2 depending on the gear ratio γcvt of the continuously-variable transmission mechanism 24 does not necessarily have to be carried out.

FIG. 5 shows, by way of example, a case in which the stepped shift-up action is determined to be executed during execution of the lap-down control, and the stepped shift-up action is controlled in a manner different from in the case shown in FIG. 3. In FIG. 5, a point t1 of time indicates a point of time at which the lap-down control is initiated. The input-shaft rotational speed Nin is increased toward the synchronized speed at the highest gear ratio value γmax, along the synchronized speed in the belt running mode, owing to the stepless shift-down action executed in the continuously-variable transmission mechanism 24. As the power-on shift-down action executed in the drive-force transmitting apparatus 16 is progressed, the input-shaft rotational speed Nin is increased toward the synchronized speed in the gear running mode, away from the synchronized speed in the belt running mode. In this instance, the progress of the stepless shift-down action of the continuously-variable transmission mechanism 24 is stagnant so that the change of the synchronized speed of the input-shaft rotational speed Nin in the belt running mode is stagnant. The C2 rotational speed difference ΔNc2, which is represented by a rotational speed difference between the input-shaft rotational speed Nin and the synchronized speed of the input-shaft rotational speed Nin in the belt running mode, is made large by the stagnation of the progress of the stepless shift-down action of the continuously-variable transmission mechanism 24. (See a stage from the point t1 of time to a point t2 of time.) A point t2 of time indicates a point of time at which the stepped shift-up action is determined to be executed in the drive-force transmitting apparatus 16 in response to reduction of the accelerator operation amount θacc. The stepped shift-up action, which is determined (at the point t2 of time) to be executed, is not started until the C2 rotational speed difference ΔNc2 becomes smaller than the second difference value $\Delta Nc2/2$. With the progress of the stepless shift-down action of the continuously-variable transmission mechanism 24, the synchronized speed of the input-shaft rotational speed Nin in the belt running mode is increased toward the synchronized speed of the input-shaft rotational speed Nin at the highest gear ratio value γmax. Meanwhile, the input-shaft rotational speed Nin, which has been increased with the progress of the power-on shift-down action in the drive-force transmitting apparatus 16, is reduced naturally with reduction of the accelerator operation amount θacc. (See a stage from the point t2 of time to a point t3 of time.) Consequently, the C2 rotational speed difference $\Delta Nc2$ is made smaller than the second difference value $\Delta Nc2/2$, so that the hydraulic-control command signal Scbd requesting execution of the stepped shift-up action (that had been determined at the point t2 of time) is outputted, as seen at the point t3 of time.

As described above, in the present second embodiment, the stepped shift-up action, which is determined to be executed during execution of the lap-down control, is executed when the C2 rotational speed difference $\Delta Nc2$ is smaller than the predetermined second difference value $\Delta Nc2/2$ that could cause the second clutch C2 to be heated by an intolerable high degree. Thus, it is possible to restrain reduction of durability of the second clutch C2 due to heat generation.

While the preferred embodiments of this invention have been described in detail by reference to the drawings, it is to be understood that the invention may be otherwise embodied.

In the above-described embodiments, the predetermined high gear ratio value γlowf is the highest gear ratio value γmax. However, the predetermined high gear ratio value γlowf may be a value adjacent to the highest gear ratio value γmax, for example. That is, the predetermined high gear ratio value γlowf does not necessarily have to be the highest gear ratio value γmax, but may be a value adjacent to the highest gear ratio value γmax, as long as the adjacent value makes it possible to restrain an amount of change of the primary rotational speed Npri upon execution of the stepped shift-up action. Even with the predetermined high gear ratio value γlowf being such an adjacent value, the execution of the lap-down control facilitates a preparation for next execution of the shift-up action in the drive-force transmitting apparatus 16.

In the above-described embodiments, the stepped shift-up action, which is determined to be executed in the drive-force transmitting apparatus 16 during execution of the lap-down control, is the power-off shift-up action. However, the present invention is applicable also to a case where the stepped shift-up action of the drive-force transmitting apparatus 16 is a power-on shift-up action, which could be determined to be executed, for example, as a result of increase of the vehicle running speed V.

In the above-described embodiments, when the stepped shift-up action, which is determined to be executed during execution of the lap-down control, is executed in the drive-force transmitting apparatus 16, the stepless shift-down action is continuously executed to increase the gear ratio γcvt of the continuously-variable transmission mechanism 24 toward the highest gear ratio value γmax. However, the stepless shift-down action does not necessarily have to be continuously executed in the continuously-variable transmission mechanism 24, for example, if the C2 rotational speed difference $\Delta Nc2$ is reduced to a value or level that could make the second clutch C2 to be heated by a tolerable degree.

The above-described first embodiment may be modified, such that steps S10, S30 and steps S20, S40 (that are shown in the flow chart of FIG. 2) may be implemented in respective control routines that are independent from each other. Similarly, the above-described second embodiment may be modified, such that step S10 and steps S20, S25 (that are shown in the flow chart of FIG. 4) may be implemented in respective control routines that are independent from each other.

In the above-described embodiments, the C2 rotational speed difference $\Delta Nc2$ may be a rotational speed difference between input and output rotary elements of the second clutch C2, or alternatively, may be a rotational speed difference between the input-shaft rotational speed Nin and the synchronized speed of the input-shaft rotational speed Nin in the belt running mode, as shown in FIG. 5. Where the rotational speed difference between a combination of the input-shaft rotational speed Nin and the synchronized speed of the input-shaft rotational speed Nin in the belt running mode is used as the C2 rotational speed difference $\Delta Nc2$, the second difference value $\Delta Nc2/2$ (i.e., a value that could cause the second clutch C2 to be heated by an intolerable high degree) is converted to a value corresponding to such a combination.

In the above-described embodiments, the continuously-variable transmission mechanism 24 is a belt-type continuously-variable transmission. However, the continuously-variable transmission mechanism provided in the second drive-force transmitting path PT2 may be a known toroidal-type continuously variable transmission, for example.

In the above-described embodiments, the second clutch C2 is disposed in a drive-force transmitting path between the secondary pulley 64 and the output shaft 30. However, this arrangement is not essential. It is possible to employ a modified arrangement in which, for example, the second clutch C2 is disposed in a drive-force transmitting path between the primary pulley 60 and the input shaft 22. In this modified arrangement, the secondary shaft 62 is connected integrally with the output shaft 30, and the primary shaft 58 is connected to the input shaft 22 through the second clutch C2.

In the above-described embodiments, the gear mechanism 28 is a gear mechanism which provides a single gear ratio that is higher than the highest gear ratio γmax of the continuously-variable transmission mechanism 24. However, the gear mechanism 28 may be, for example, a gear mechanism which provides a plurality of different gear ratios. That is, the gear mechanism 28 may be a stepped-variable transmission in which a shifting action is to be executed from one of two or more gear positions to the other. Alternatively, the gear mechanism 28 may be a gear mechanism that provides a gear ratio that is lower than the lowest gear ratio γmin of the continuously-variable transmission mechanism 24 and another gear ratio that is higher than the highest gear ratio γmax of the continuously-variable transmission mechanism 24.

In the above-described embodiments, the running mode of the drive-force transmitting apparatus 16 is switched between the gear running mode and the belt running mode, by using the shifting map in which the shift-up lines and shift-down lines are defined. However, the running mode of the drive-force transmitting apparatus 16 may be switched by setting a gear ratio satisfying the required drive force Fdem that is calculated based on the running speed V and the accelerator operation amount θacc.

In the above-described embodiments, the torque converter 20 is used as fluid-operated drive-force transmitting device.

However, in place of the torque converter 20, any one of other types of fluid-operated drive-force transmitting devices such as a fluid coupling, which do not have a torque boosting function, may be used, for example. Further, the fluid-operated drive-force transmitting device does not have to be necessarily provided. In the above-described embodiment, the dog clutch D1 is provided in the first drive-force transmitting path PT1 through which the drive force is to be transmitted by the gear mechanism 28. However, the provision of the dog clutch D1 is not essential for carrying out the invention.

It is to be understood that the embodiments described above are given for illustrative purpose only, and that the present invention may be embodied with various modifications and improvements which may occur to those skilled in the art.

NOMENCLATURE OF ELEMENTS

12: engine (drive force source)
14: drive wheels
16: vehicle drive-force transmitting apparatus
22: input shaft (input rotary member)
24: continuously-variable transmission mechanism (continuously-variable transmission)
28: gear mechanism
30: output shaft (output rotary member)
60: primary pulley
64: secondary pulley
66: transmission belt (transfer element)
90: electronic control apparatus (control apparatus)
94: transmission shifting control portion
C1: first clutch (first engagement device)
C2: second clutch (second engagement device)
PT1: first drive-force transmitting path
PT2: second drive-force transmitting path

What is claimed is:

1. A control apparatus for a drive-force transmitting apparatus that is to be provided in a vehicle having a drive force source and drive wheels,
wherein the drive-force transmitting apparatus includes:
an input rotary member to which a drive force is to be transmitted from the drive force source;
an output rotary member from which the drive force is to be outputted to the drive wheels;
a continuously-variable transmission mechanism configured to provide a continuously-variable gear ratio that is variable within a given range; and
a gear mechanism configured to provide at least a gear ratio that is higher than the continuously-variable gear ratio provided by the continuously-variable transmission mechanism,
wherein the drive-force transmitting apparatus defines a plurality of drive-force transmitting paths that are provided in parallel with each other between the input rotary member and the output rotary member such that the drive force is to be transmitted from the input rotary member to the output rotary member through an established one of the drive-force transmitting paths,
wherein the plurality of drive-force transmitting paths include a first drive-force transmitting path, through which the drive force is to be transmitted by the gear mechanism when the first drive-force transmitting path is established,
wherein the plurality of drive-force transmitting paths include a second drive-force transmitting path, through which the drive force is to be transmitted by the continuously-variable transmission mechanism when the second drive-force transmitting path is established,
wherein the drive-force transmitting apparatus is configured to establish a selected state that is one of (i) a first state in which the first drive-force transmitting path is established and (ii) a second state in which the second drive-force transmitting path is established,
wherein said control apparatus comprises a transmission shifting control portion configured to execute a lap-down control by which a shift-down action requiring the selected state to be switched from the second state to the first state is executed together with execution of a shift-down action of the continuously-variable gear ratio that is executed to increase the continuously-variable gear ratio of the continuously-variable transmission mechanism to a predetermined high gear ratio value,
wherein, when determining that a shift-up action requiring the selected state to be switched from the first state to the second state is to be executed, said transmission shifting control portion is configured to cause the drive-force transmitting apparatus to execute said shift-up action in (a) a case in which a state of the drive-force transmitting apparatus upon determination for execution of said shift-up action satisfies a first condition including a requirement that the continuously-variable gear ratio of the continuously-variable transmission mechanism is not lower than a first gear ratio value and in (b) a case in which said state of the drive-force transmitting apparatus satisfies a second condition including a requirement that said lap-down control is executed and a requirement that the continuously-variable gear ratio of the continuously-variable transmission mechanism is not lower than a second gear ratio value that is lower than said first gear ratio value.

2. The control apparatus according to claim 1, wherein said predetermined high gear ratio value is a highest value within the given range in which the continuously-variable gear ratio of the continuously-variable transmission mechanism is variable, or is a value adjacent to the highest value.

3. The control apparatus according to claim 1, wherein said first gear ratio value is a predetermined first lower limit gear ratio value that is minimally required to determine that the continuously-variable gear ratio of the continuously-variable transmission mechanism corresponds to said predetermined high gear ratio value.

4. The control apparatus according to claim 1, wherein said second gear ratio value is a predetermined second lower limit gear ratio value that is minimally required to permit execution of said lap-down control.

5. The control apparatus according to claim 1, wherein it is determined that said lap-down control is executed, when said lap-down control is being actually executed, and when execution of said lap-down control has been terminated without a length of time, which has elapsed since termination of the execution of said lap-down control, exceeding a predetermined upper limit value.

6. The control apparatus according to claim 1,
wherein the drive-force transmitting apparatus further includes a first engagement device that is provided in the first drive-force transmitting path and a second engagement device that is provided in the second drive-force transmitting path,
wherein the first drive-force transmitting path is to be established by engagement of the first engagement device while the second drive-force transmitting path is to be established by engagement of the second engagement device, and wherein said transmission shifting control portion is configured to cause the drive-force transmitting apparatus to execute said shift-down action by engaging the first engagement device and releasing the second engagement device, and is configured to cause the drive-force transmitting apparatus to execute said shift-up action by releasing the first engagement device and engaging the second engagement device.

7. The control apparatus according to claim 6, wherein the second engagement device is to be engaged by an engaging pressure applied to the second engagement device, and wherein said transmission shifting control portion is configured, when said second condition is satisfied by said state of the drive-force transmitting apparatus, to cause the drive-force transmitting apparatus to execute said shift-up action, with the engaging pressure being made lower as the continuously-variable gear ratio of the continuously-variable transmission mechanism is lower.

8. The control apparatus according to claim 7, wherein, when said shift-up action is a power-off shift-up action that is determined to be executed as a result of reduction of a required drive force, said transmission shifting control portion is configured to cause the engaging pressure to be gradually increased after a rotational speed difference of the second engagement device becomes not larger than a first difference value, such that a rate of gradual increase of the engaging pressure is made lower as the continuously-variable gear ratio of the continuously-variable transmission mechanism upon initiation of the gradual increase of the engaging pressure is lower, whereby the engaging pressure is made lower as the continuously-variable gear ratio of the continuously-variable transmission mechanism is lower.

9. The control apparatus according to claim 6, wherein the second engagement device is a frictional engagement device, and wherein said second condition further includes a requirement that a rotational speed difference of the second engagement device is smaller than a second difference value.

10. The control apparatus according to claim 1, wherein, when causing the drive-force transmitting apparatus to execute said shift-up action in the case in which said state of the drive-force transmitting apparatus satisfies said second condition, said transmission shifting control portion is configured to cause the continuously-variable transmission mechanism to continuously execute said shift-down action of the continuously-variable gear ratio by which the continuously-variable gear ratio of the continuously-variable transmission mechanism is increased to said predetermined high gear ratio value.

11. The control apparatus according to claim 1, wherein said shift-down action, which is executed in execution of said lap-down control, is a power-on shift-down action that is determined to be executed as a result of increase of a required drive force.

12. The control apparatus according to claim 1, wherein the continuously-variable transmission mechanism is a belt-type continuously-variable transmission including a primary pulley, a secondary pulley, a transfer element that is looped over the primary and secondary pulleys.

13. The control apparatus according to claim 1, further comprising:

a state determining portion that is configured, when said transmission shifting control portion determines that said shift-up action is to be executed, to determine whether said state of the drive-force transmitting apparatus upon the determination for execution of said shift-up action satisfies at least one of said first and second conditions, and wherein said transmission shifting control portion is configured to cause the drive-force transmitting apparatus to execute said shift-up action, when said state determining portion determines that said state of the drive-force transmitting apparatus satisfies said at least one of said first and second conditions.

* * * * *